(12) United States Patent
Nakamura

(10) Patent No.: US 6,914,630 B2
(45) Date of Patent: Jul. 5, 2005

(54) IMAGING APPARATUS AND SIGNAL PROCESSING METHOD FOR THE SAME

(75) Inventor: Satoru Nakamura, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 630 days.

(21) Appl. No.: 10/115,973

(22) Filed: Apr. 5, 2002

(65) Prior Publication Data

US 2002/0145674 A1 Oct. 10, 2002

(30) Foreign Application Priority Data

Apr. 9, 2001 (JP) ..................................... 2001-110452

(51) Int. Cl.⁷ ............................................. H04N 5/335
(52) U.S. Cl. ..................................... 348/296; 348/364
(58) Field of Search ................................ 348/362, 363, 348/364, 365, 367, 296, 221.1, 222.1, 224.1, 229.1

(56) References Cited

U.S. PATENT DOCUMENTS

| | | | |
|---|---|---|---|
| 4,647,975 A | | 3/1987 | Alston et al. |
| 5,396,288 A | * | 3/1995 | Tsugita et al. ............ 348/229.1 |
| 5,543,837 A | * | 8/1996 | Aoki et al. .................. 348/264 |
| 5,883,666 A | | 3/1999 | Kyuma et al. |
| 6,747,694 B1 | * | 6/2004 | Nishikawa et al. ...... 348/229.1 |
| 6,809,761 B1 | * | 10/2004 | Tamaru .................... 348/229.1 |
| 2002/0145674 A1 | * | 10/2002 | Nakamura .................... 348/296 |
| 2003/0210345 A1 | * | 11/2003 | Nakamura et al. .......... 348/362 |
| 2004/0165091 A1 | * | 8/2004 | Takemura et al. .......... 348/296 |

\* cited by examiner

*Primary Examiner*—Aung Moe
(74) *Attorney, Agent, or Firm*—Oblon, Spivak, McClelland, Maier & Neustadt, P.C.

(57) ABSTRACT

An imaging apparatus is disclosed which comprises a first image signal generation section generating a first image signal in a first exposure time, a second image signal generation section generating a second image signal in a second exposure time, an image combining section combining the first and second image signals into a composite image signal, an integrated value calculation circuit determining the average luminance values of the first and second image signals, a peak value detection circuit detecting the peak values of the first and second image signals, an exposure time control section responsive to the integrated value and the peak value controlling the first and second exposure times, and a gain control circuit controlling the amplitude of each of the first and second image signals to be applied to the image combining section individually.

16 Claims, 16 Drawing Sheets

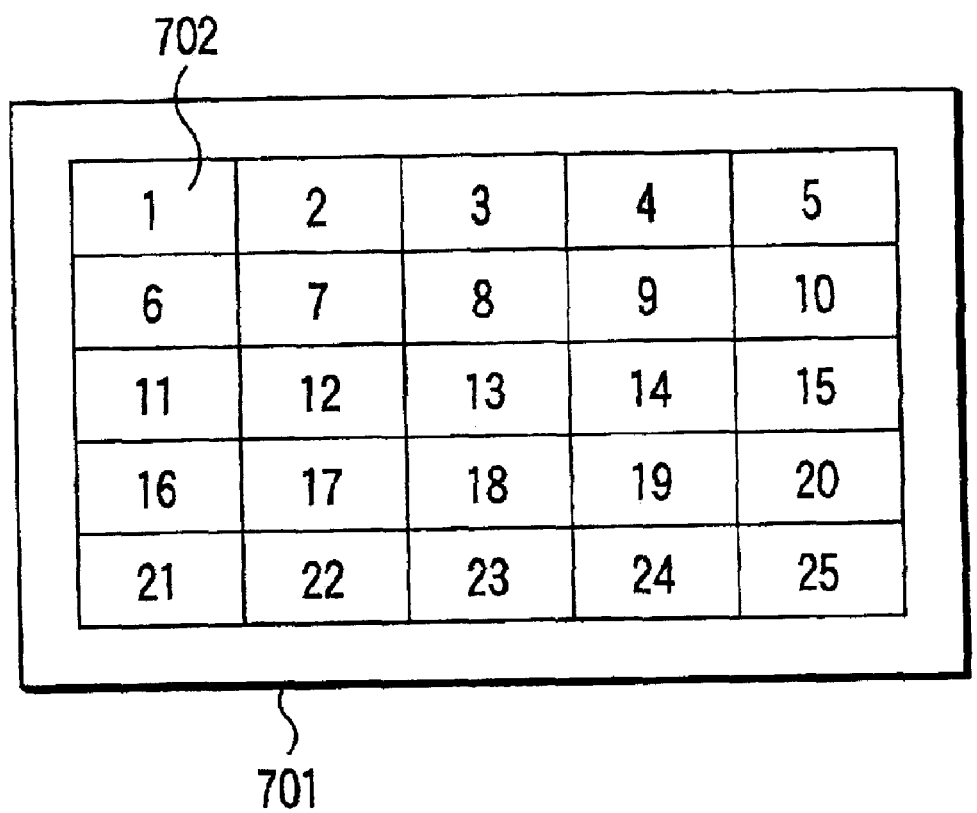
F I G. 7

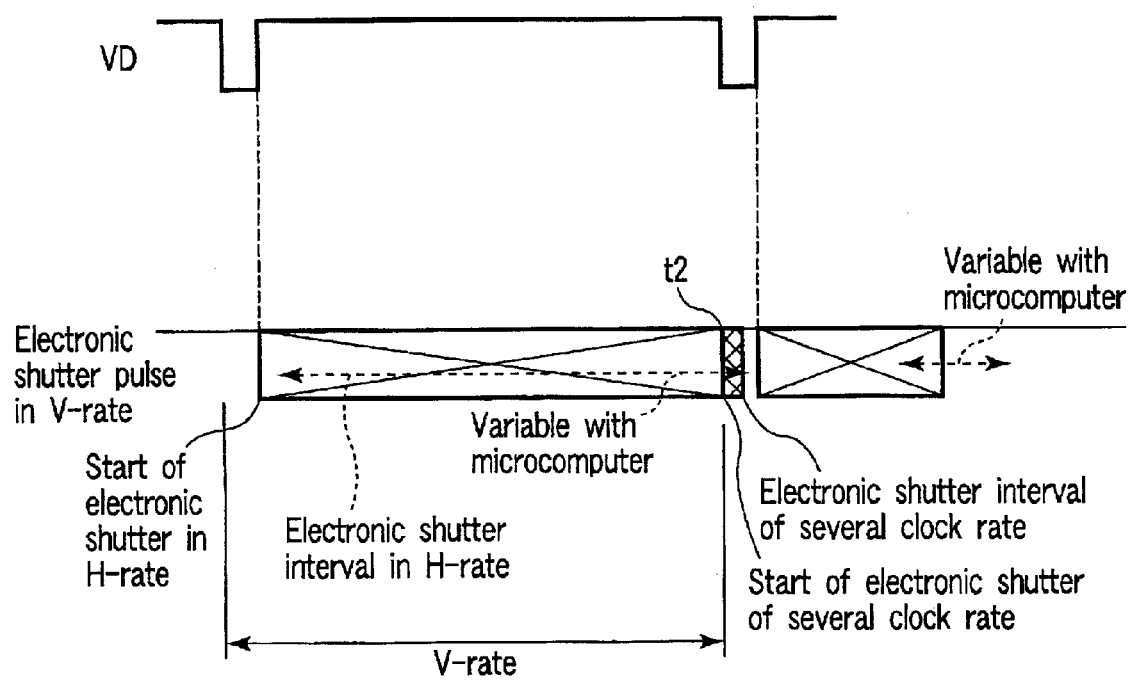
F I G. 17
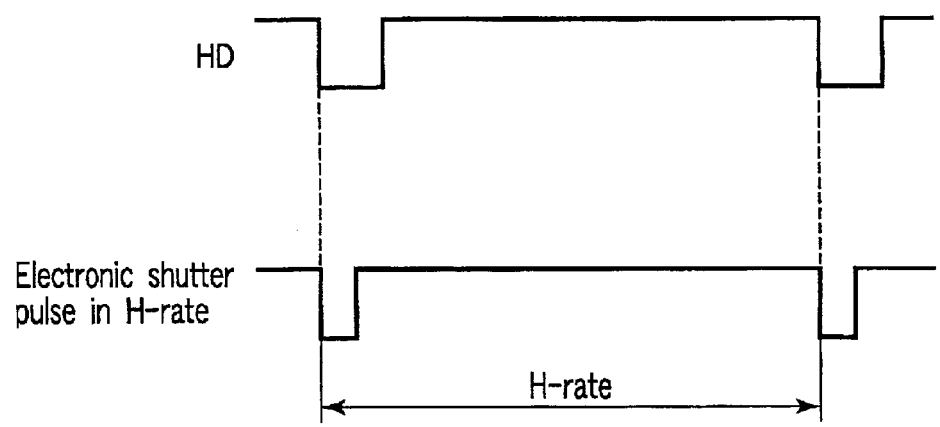
F I G. 18

IMAGING APPARATUS AND SIGNAL PROCESSING METHOD FOR THE SAME

CROSS-REFERENCE TO RELATED APPLICATIONS

This application is based upon and claims the benefit of priority from the prior Japanese Patent Application No. 2001-110452, filed Apr. 9, 2001, the entire contents of which are incorporated herein by reference.

BACKGROUND OF THE INVENTION

1. Field of the Invention

The present invention relates to extending the dynamic range of a television camera and more particularly to a wide dynamic range imaging apparatus that permits scenes having a wide range of luminance to be captured and an image signal processing method for use therewith 2. Description of the Related Art With conventional cameras using imaging elements such as charge coupled devices (CCDs), the amount of incident light is controlled to within a certain range because of limitations on their charge accumulation capacity and their charge accumulation characteristics. In outdoor shooting, therefore, the dynamic range cannot be obtained which allows the luminance variations of scenes to be captured successfully, which will lead to a problem of image quality.

For this reason, in the prior art, the dynamic range has been extended through the use of the electronic shutter function of the imaging element; that is, by capturing the image of a scene at high and low shutter speeds and processing the resultant image signals.

An electronic camera adapted to increase the dynamic range of the imaging element by combining image data obtained using different controlled parameters during two successive electronic shutter intervals is disclosed in, for example, U.S. Pat. No. 4,647,975.

However, in the conventional electronic cameras, the low and high shutter speeds and the image data combination ratio are fixed. The above method by which images captured several times at different shutter speeds are combined is effective in increasing the dynamic range of devices adapted to capture still images but is not suitable for devices adapted to capture the images of moving objects, such as supervisory cameras

BRIEF SUMMARY OF THE INVENTION

According to the present invention, there is provided an imaging apparatus comprising: a first image signal generation section generating a first image signal in image field units by capturing the image of a scene in a first exposure time; a second image signal generation section generating a second image signal in image field units by capturing the image of the scene in a second exposure time different from the first exposure time; an image combining section combining the first and second image signals into a composite image signal by adding the first and second image signals or switching between them on a pixel basis; an integrated value calculation circuit determining the average luminance values of the first and second image signals; a peak value detection circuit for detecting the peak values of the first and second image signals; an exposure time control signal generation section responsive to outputs of the integrated value calculation circuit and the peak value detection circuit generating control signals controlling the first and second exposure times; and a gain control circuit controlling the amplitude of each of the first and second image signals to be applied to the image combining section individually.

BRIEF DESCRIPTION OF THE SEVERAL VIEWS OF THE DRAWING

FIG. 7 shows an example of a divided image field;

FIG. 17 shows the electronic shutter pulse generation timing in relation to the vertical sync period;

FIG. 18 shows the electronic shutter pulse generation timing in relation to the horizontal sync period;

DETAILED DESCRIPTION OF THE INVENTION

First, the operating principle of a camera having a wide dynamic range will be described with reference to FIGS. 1A and 1B.

Figure 1A:
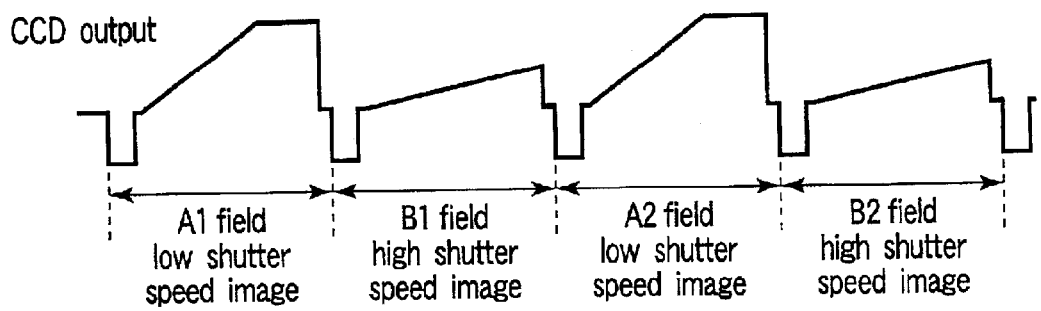
FIGS. 1A and 1B are waveform diagrams of image signals for use in explanation of the operating principles of a wide dynamic range camera.

FIG. 1A shows an output image signal from the CCD. Like a low shutter speed image in A1 field, a high shutter speed image in B1 field, a low shutter speed image in A2 field, and a high shutter speed image in B2 field, image signals captured at low and high shutter speeds are alternately output from the CCD.

Figure 1B:
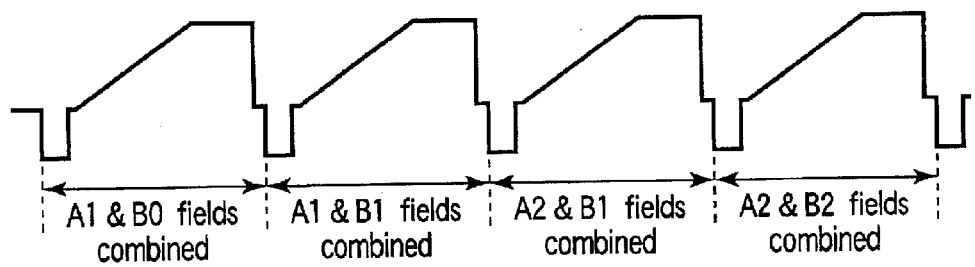

FIG. 1B shows the waveform of a camera image signal with a wide dynamic range. The image signal from the camera consists of a composite image signal having low shutter speed image signals in the A fields (A1, A2, . . . in FIG. 1A) and high shutter speed image signals in the B fields (B1, B2, . . . in FIG. 1A) combined.

The low shutter speed image signal is one obtained at an exposure time of, say, 1/60 sec, whereas the high shutter speed image signal is one obtained at an exposure time of, say, 1/2000 sec. The exposure time is set by controlling the charge accumulation time using an electronic shutter that directly provides shutter pulses to the CCD.

The wide dynamic range camera captures the image of low-luminance portions of a scene at a low shutter speed (high-luminance portions are saturated) and the image of the high-luminance portions at a high shutter speed (the low-luminance portions are too dark to be captured). The two resultant images are then combined, thereby allowing an image in which the low- and high-luminance portions of the scene are contained in one image field to be produced.

For example, as shown in FIG. 1B, the low shutter speed image signal in the A1 field and the high shutter speed image signal in the B0 field (not shown) are combined and then the low shutter speed image signal in the A1 field and the high shutter speed image signal in the B1 field are combined. The similar operation is repeated.

In the case of still images, the ratio between the low and high shutter speeds and the ratio at which the low shutter speed image signal and the high shutter speed image signal are combined are fixed. The rate at which the dynamic range is extended is determined from the ratio of shutter speeds. For example, if the low shutter speed is fixed at 1/60 sec and the high shutter speed is fixed at 1/2000 sec, then the wide dynamic range camera will have an extension rate of about 32. Even with a camera that has a built-in auto-iris lens adapted to automatically control the amount of incident light, its dynamic range cannot be increased.

Figure 2:
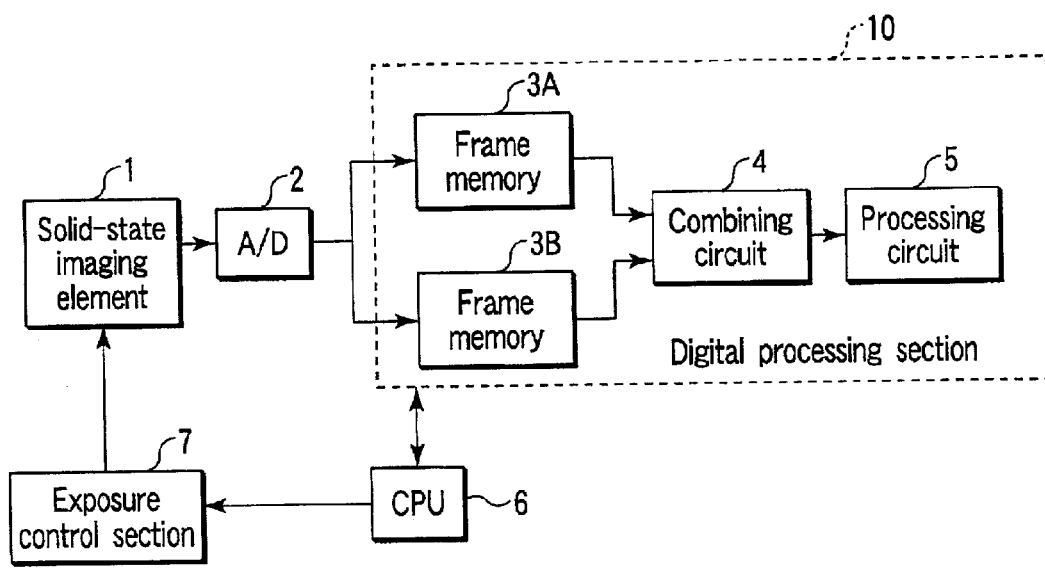
FIG. 2 is a block diagram illustrating the basic architecture of the wide dynamic range camera.

In FIG. 2, there is illustrated, in a block diagram form, the basic configuration of the wide dynamic range camera. An image signal obtained by a solid-state imaging element 1 is converted by an analog-to-digital (A/D) converter 2 into digital form and the resultant digital signals are alternately written into frame memories 3A and 3B. Signals read from the frame memories 3A and 3B are fed into a combining circuit 4 and then output from a processing circuit 5.

A control section consists of a central processing unit (CPU) 6 and an exposure control section 7. The CPU 6 performs operations on photometric data from a digital processing section 10 enclosed by broken lines. The results of the operations are fed into the digital processing section 10 and the exposure control section 7 to control the digital processing section and the solid-state imaging element 1.

As described previously, with the wide dynamic range camera adapted to capture still images, the ratio of low and high shutter speeds and the ratio at which low shutter speed and high shutter speed image signals are combined are fixed. The image of a scene is captured several times at different shutter speeds and the resultant images are combined. This technique therefore fails to implement a wide dynamic range camera which, like a supervisory camera, is adapted to capture the image of a scene in which dark and light portions are mixed and which contains a moving object.

Hereinafter, the configuration and operation of a wide dynamic range camera according to an embodiment of the invention will be described. In capturing the image of a scene in which dark and light portions are mixed and which contains a moving object, the camera allows the exposure time (shutter speed) to be determined automatically according to the brightness of the scene.

That is, the embodiment is configured such that a exposure time is automatically optimized for each of dark and bright portions (i.e., a low shutter speed is set for the dark portion and a high shutter speed is set for the bright portion), and image signals obtained at the low and high shutter speeds are added together and then subjected to a nonlinear operation, thereby allowing the image of a scene (moving scene) in which dark and bright portions are mixed and which contains a moving object to be captured successively.

In other words, the dynamic range of the camera is changed at high speed according to variations of brightness in a moving scene to obtain an optimum image, thereby providing a circuit arrangement and a signal processing method for use in a vehicle-aboard camera for recognizing images having very large brightness variations and a wide dynamic range imaging apparatus for use in a supervisory camera for simultaneously capturing indoor and outdoor scenes.

Specifically, the above operation is implemented by calculating the optimum exposure times from a low shutter speed image signal and a high shutter speed image signal and controlling each of the low and high shutter speeds independently. Next, the embodiment of the present invention will be described in conjunction with the drawings. First, using FIGS. 3 through 7, the configuration and operation of a wide dynamic range imaging apparatus of the present invention will be described.

Figure 3:
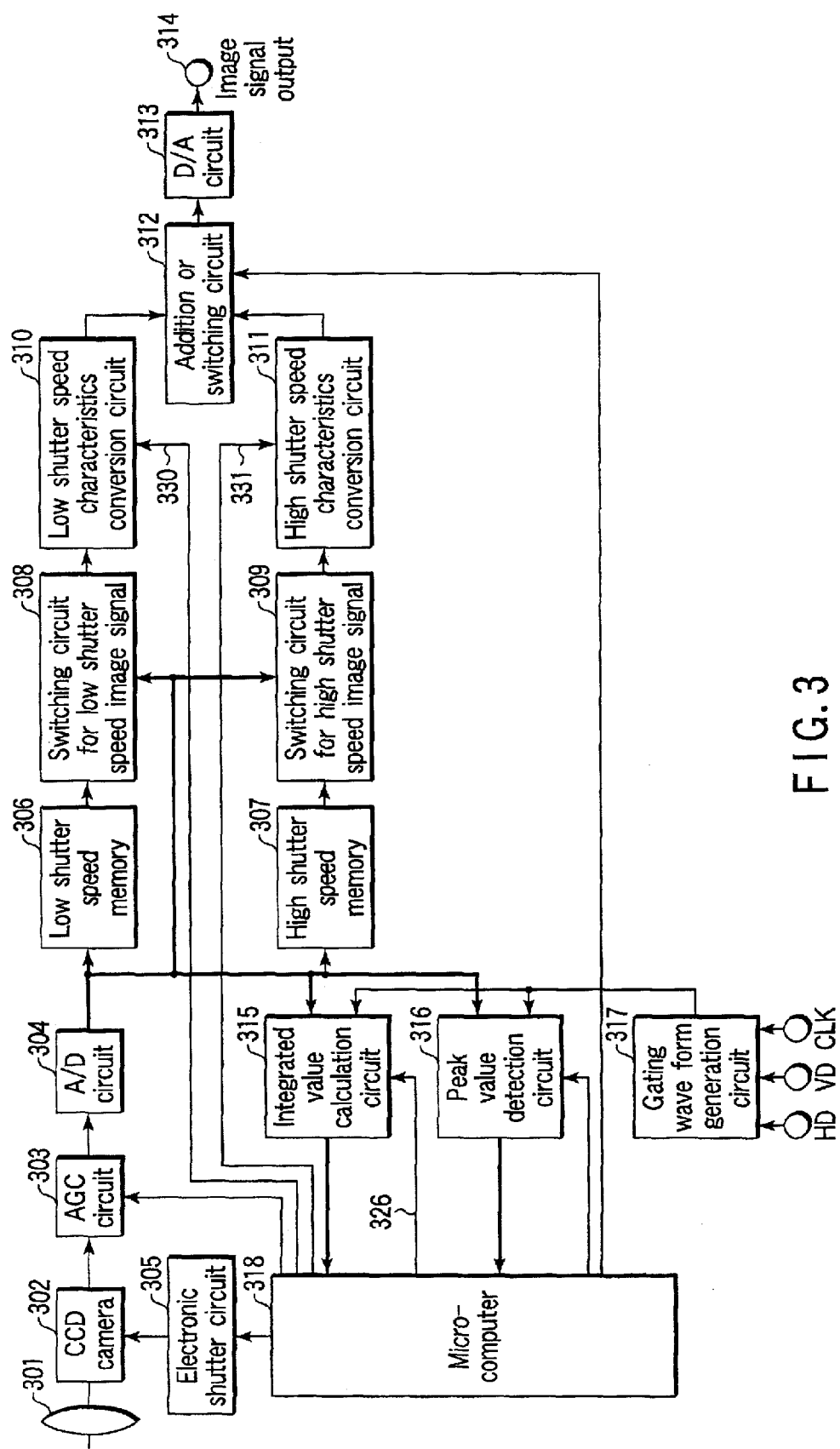
FIG. 3 is a block diagram of a wide dynamic range imaging apparatus of the present invention.

FIG. 3 shows a block diagram of the wide dynamic range imaging apparatus. The optical image of a scene captured by an imaging lens 301 is focused onto the imaging element of a CCD camera 302 and a corresponding electrical image signal is then output from the camera. The imaging element of the CCD camera 302 is controlled by an electronic shutter circuit 305 to operate at two different shutter speeds: a low shutter speed and a high shutter speed.

The output image signal of the CCD camera 302 is input to an AGC circuit 303 the gain of which is controlled by a control signal from a microcomputer 318. The gain control is performed independently with each field. That is, each of a low shutter speed image signal and a high shutter speed image signal is controlled independently.

The image signal from the AGC circuit 303 is input to an A/D circuit 304 where it is converted into a digital image signal. High and low speed shutter signals are alternately supplied from the electronic shutter circuit 305 to the CCD camera 302, so that a low shutter speed image signal and a high shutter speed image signal are alternately output with each field.

The low and high shutter speed image signals are fed into memories 306 and 307, respectively, each of which corresponds to a respective one of two successive vertical intervals, so that they are separated.

The input and output signals of the memory 306 are input to a switching circuit 308 which outputs the low shutter speed image signal obtained in every other field as a low shutter speed image signal in successive fields. On the other hand, the input and output signals of the memory 307 are input to a switching circuit 309 which outputs the high shutter speed image signal obtained in every other field as a high shutter speed image signal in successive fields.

That is, the switching circuit 308 outputs the low shutter speed image signal in succession and the switching circuit 309 outputs the high shutter speed image signal in succession. These low and high shutter speed image signals are applied to characteristics conversion circuits 310 and 311, respectively. In the conversion circuits, nonlinear conversion, called gamma correction in the field of photographic film, is performed.

The output signals of the conversion circuits 310 and 311 are applied to an addition or switching circuit 312, which is adapted to add the low and high shutter speed image signals or switch between them for each pixel so as to make a wide luminance range of image signal easier to view. This signal processing is controlled by a control signal from the microcomputer 318 to convert the characteristics of the image signal according to the shutter speeds.

The output signal of the addition or switching circuit 312 is converted by a digital-to-analog (D/A) conversion circuit 313 into an analog signal, which is in turn output to outside via an output terminal 314.

The AGC circuit 303, the A/D conversion circuit 304, the memory circuits 306 and 307, the switching circuits 308 and 309, the characteristic conversion circuits 310 and 311, the addition or switching circuit 312, and the D/A conversion circuit 313 form an image signal processing section. An integrated value calculation circuit 315, a peak value detection circuit 316, the microcomputer 318, and the electronic shutter circuit 305 form a section adapted to extend the dynamic range of the camera.

Figure 4:
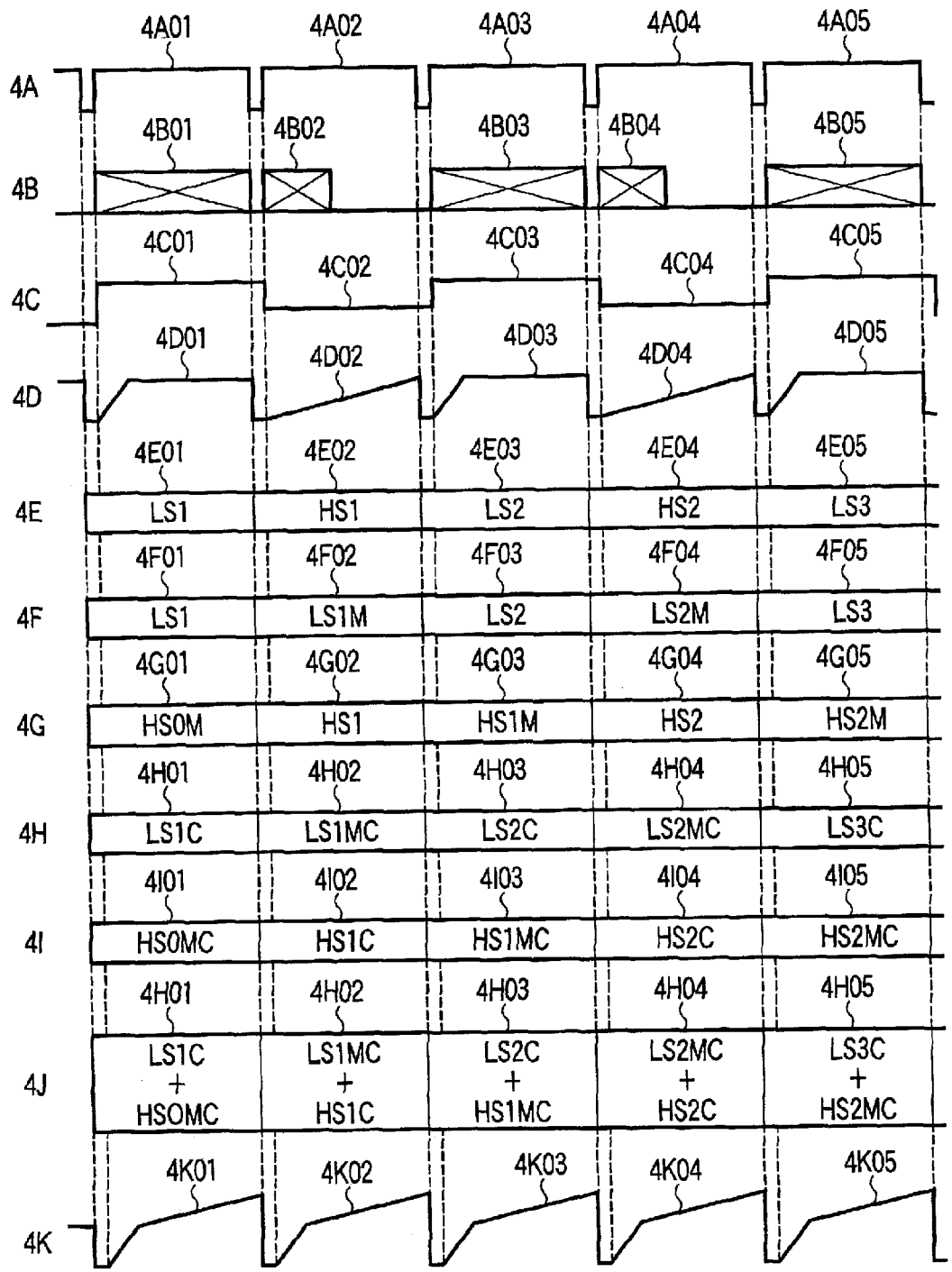
FIG. 4 is a diagram for use in explanation of the operation of the imaging apparatus of the present invention.

FIG. 4 is a diagram for use in explanation of the operation of the wide dynamic range camera. In this figure, 4A denotes a vertical sync signal with which the camera is synchronized to operate. In the image signal output intervals of the CCD camera 302, 4A01 denotes a low shutter speed interval, 4A02 denotes a high shutter speed interval, 4A03 denotes a low shutter speed interval, 4A04 denotes a high shutter speed interval, and 4A05 denotes a low shutter speed interval.

In the electronic shutter operation of the CCD imaging device, due to a delay of one vertical period (field period) between the accumulation time and the read time, a high-speed shutter operation is performed during the interval 4B01, and a low-speed shutter operation is performed during the interval 4B02 as shown at 4B. The high and low shutter speed operations are also performed alternately in the following intervals 4B03, 4B04, 4B05, etc.

The AGC circuit 303 operates independently for each of the high and low shutter speed operations. An AGC operation corresponding to the low-speed shutter operation is performed during interval 4C01 and an AGC operation corresponding to the high-speed shutter operation is performed during interval 4C02. These AGC operations are also performed alternately in the following intervals 4C03, 4C04, 4C05, etc.

The output image signals of the CCD camera 302 are shown at 4D. The output 4D01 is an output image signal obtained at the low shutter speed and the output 4D02 is an output image signal at the high shutter speed. An output image signal at the low shutter speed and an output image signal at the high shutter speed are output alternately as shown at 4D03, 4D04, 4D05, etc.

The remaining portion of FIG. 4 is provided to help understand the operation. At 4E, like 4D, there are illustrated the output signals of the A/D converter 304 in FIG. 3, in which 4E01 denotes a low shutter speed output image signal LS1, 4E02 denotes a high shutter speed output image signal HS1, 4E03 denotes a low shutter speed output image signal LS2, 4E04 denotes a high shutter speed output image signal HS2, and so on.

The output image signals LS1, HS1, LS2, HS2, etc. are selectively input to the memory circuits 306 and 307 in FIG. 3 the outputs of which are input to the switching circuits 308 and 309, respectively.

As shown at 4F, this operation provides successive image signals of LS1, LS1M, LS2, LS2M, and so on at low shutter speed. As shown at 4G, the image signals, HS0M, HS1, HS1M, HS2, HS2M, etc., provides successive image signals at high shutter speed. Here, the signals with M are output image signals of the memory circuits 306 and 307, while the signals without M are output image signals directly transmitted from the A/D converter 304.

The successive image signals at low and high shutter speeds are applied to the conversion circuits 310 and 311, respectively. As shown at 4H, the conversion circuit 310 outputs characteristic-converted image signals LS1C, LS1MC, LS2C, LS2MC, LS3C, etc. As shown at 4I, the conversion circuit 311 outputs characteristic-converted image signals HS0MC, HS1C, HS1MC, HS2C, HS2MC, etc. Here, "C" represents that the characteristic of the corresponding image signal has been converted.

Next, as shown at 4J, the corresponding characteristic-converted image signals at the low and high shutter speeds are added together in the addition circuit or switching circuit 312. Each of image signals 4K01, 4K02, 4K03, 4K04, 4K05, etc. shown at 4K represents the sum of a low shutter speed image output signal and a high shutter speed image output signal. Depending on the mode of operation of the camera, the addition circuit 312 may be used as a switching circuit that switches between low and high shutter speed image output signals on a pixel-by-pixel basis.

Figure 5:
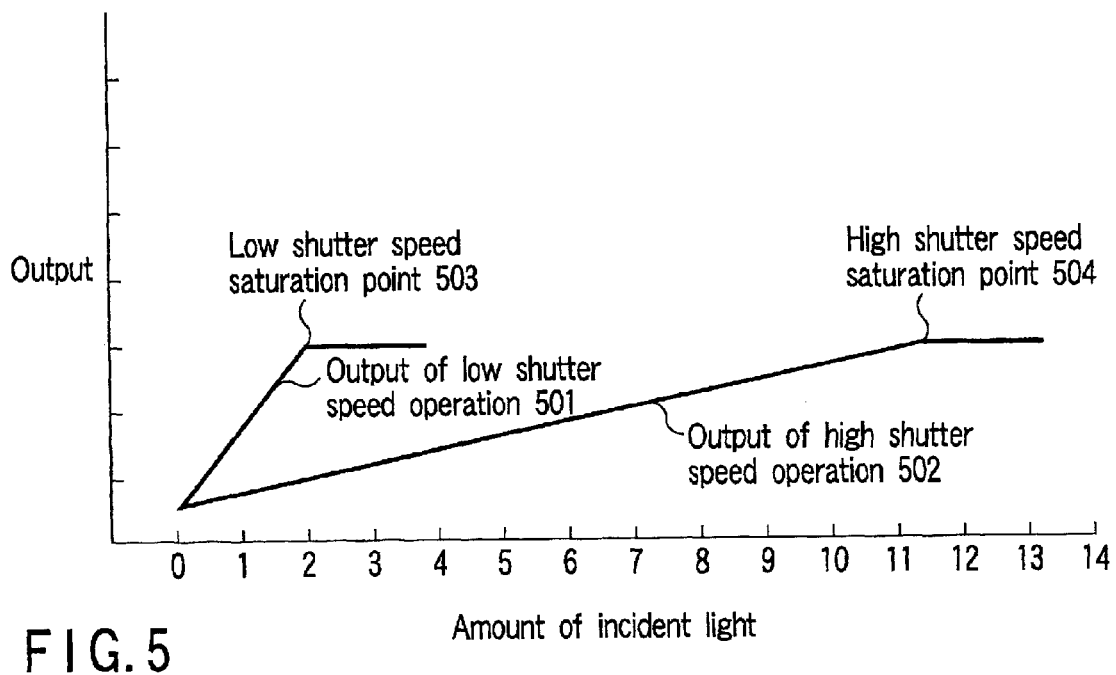
FIG. 5 shows the imaging characteristics of the imaging element used in the imaging apparatus.

FIG. 5 shows the imaging characteristics of the CCD imaging element having an electronic shutter built in. The image output signals shown at 4D and 4K in FIG. 4 are output based on the imaging characteristics. In the operation at each of low and high shutter speeds, the magnitude of the image output signal varies according to the amount of incident light as shown in FIG. 5.

In FIG. 5, 501 represents the output characteristic at the low shutter speed, 502 represents the output characteristic at the high shutter speed, 503 represents the output saturation point at the low shutter speed, and 504 represents the output saturation point at the high shutter speed. The low shutter speed image signal and the high shutter speed image signal are subjected to, for example, gamma correction in the characteristic conversion circuits 310 and 311, respectively. The characteristics of the two image signals are defined by control signals 330 and 331 from the microcomputer 318.

Figure 6:
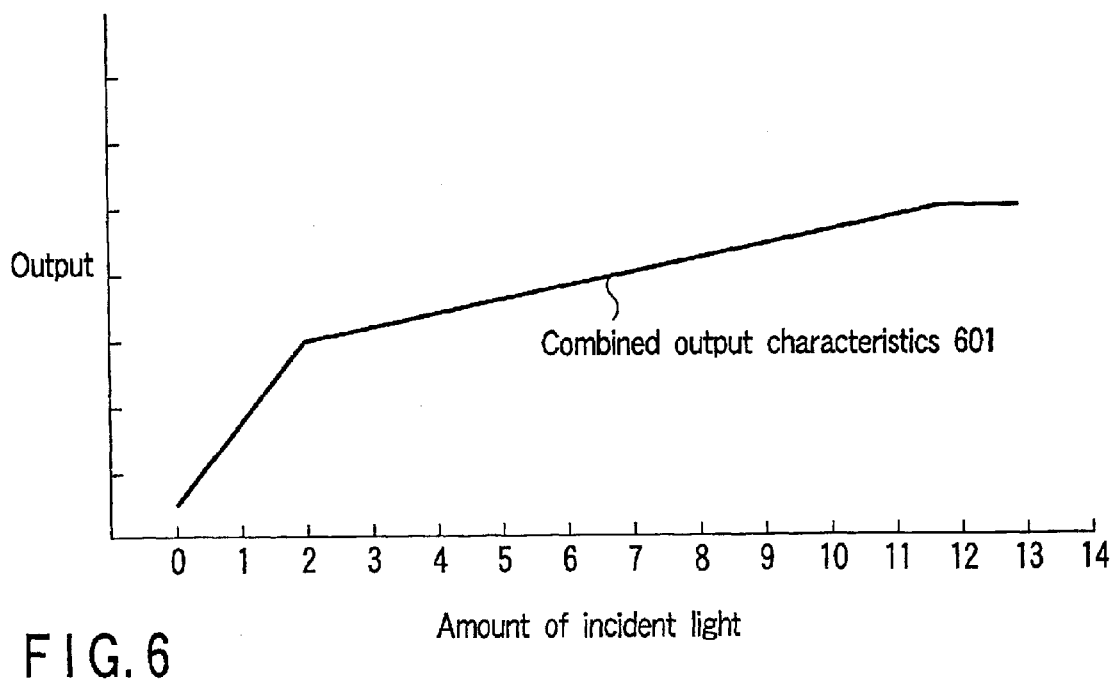
FIG. 6 shows combined output characteristics of the imaging apparatus of the present invention.

The output signals of the conversion circuits 310 and 311 are added or switched in the addition or switching circuit 312. In this case, the output characteristic 501 in the low-speed shutter operation and the output characteristic 502 in the high-speed shutter operation are combined to produce a composite output characteristic 601 as shown in FIG. 6. An output signal based on the composite output characteristic 601 is converted by the D/A converter 313 into an analog signal, which in turn is delivered from the output terminal 314 to outside.

Returning to FIG. 3, description is given of the operation of the section adapted to increase the dynamic range. The integrated value calculation circuit 315 and the peak value detection circuit 316 form circuitry for determining the exposure time of the electronic shutter circuit 305.

In the integrated value calculation circuit 305, a luminance signal for one image field from the A/D converter 304 is integrated for each of divided regions and the resultant integrated values are sent to the microcomputer 318. The peak value detection circuit 316 detects the peak value of the luminance signal for one image field from the A/D converter 304 and then sends it to the microcomputer 318.

In the integrated value calculation circuit 315 and the peak value detection circuit 316, divided regions are set up on the image field as shown in FIG. 7. That is, the image field 701 is divided into 25 regions 702 to determine the integrated values and the peak value. To divide the image field, use is made of gating waveforms generated by the gating waveform generation circuit 317.

The gating waveform generation circuit 317 generates gating signals from a horizontal sync signal HD, a vertical sync signal VD, and a clock signal CLK. The gating signals are sent to the integrated value calculation circuit 315 and the peak value detection circuit 316, which determine the integrated value and peak value, respectively, of the image signal for each divided region 702.

The microcomputer 318 is responsive to the information from the integrated value calculation circuit 315 and the peak value detection circuit 316 to determine exposure times (shutter speeds). The high shutter speed is determined mainly from the information from the peak value detection circuit 316, while the low shutter speed is determined mainly from the information from the integrated value calculation circuit 315. Control signals based on those information are sent to the electronic shutter circuit 305.

The electronic shutter circuit 305 applies a high-speed shutter pulse and a low-speed shutter pulse to the imaging element in the CCD camera 302 according to the exposure times determined by the microcomputer 318.

Thus, a wide dynamic range camera can be realized which, in shooting a scene that contains dark and bright elements and a moving object, automatically determines the exposure time according to the brightness of the scene.

Next, the arrangement and operation of each circuit in the wide dynamic range camera of the present invention shown in FIG. 3 will be described in detail. First, the integrated value calculation circuit 315 will be described.

Figure 8:
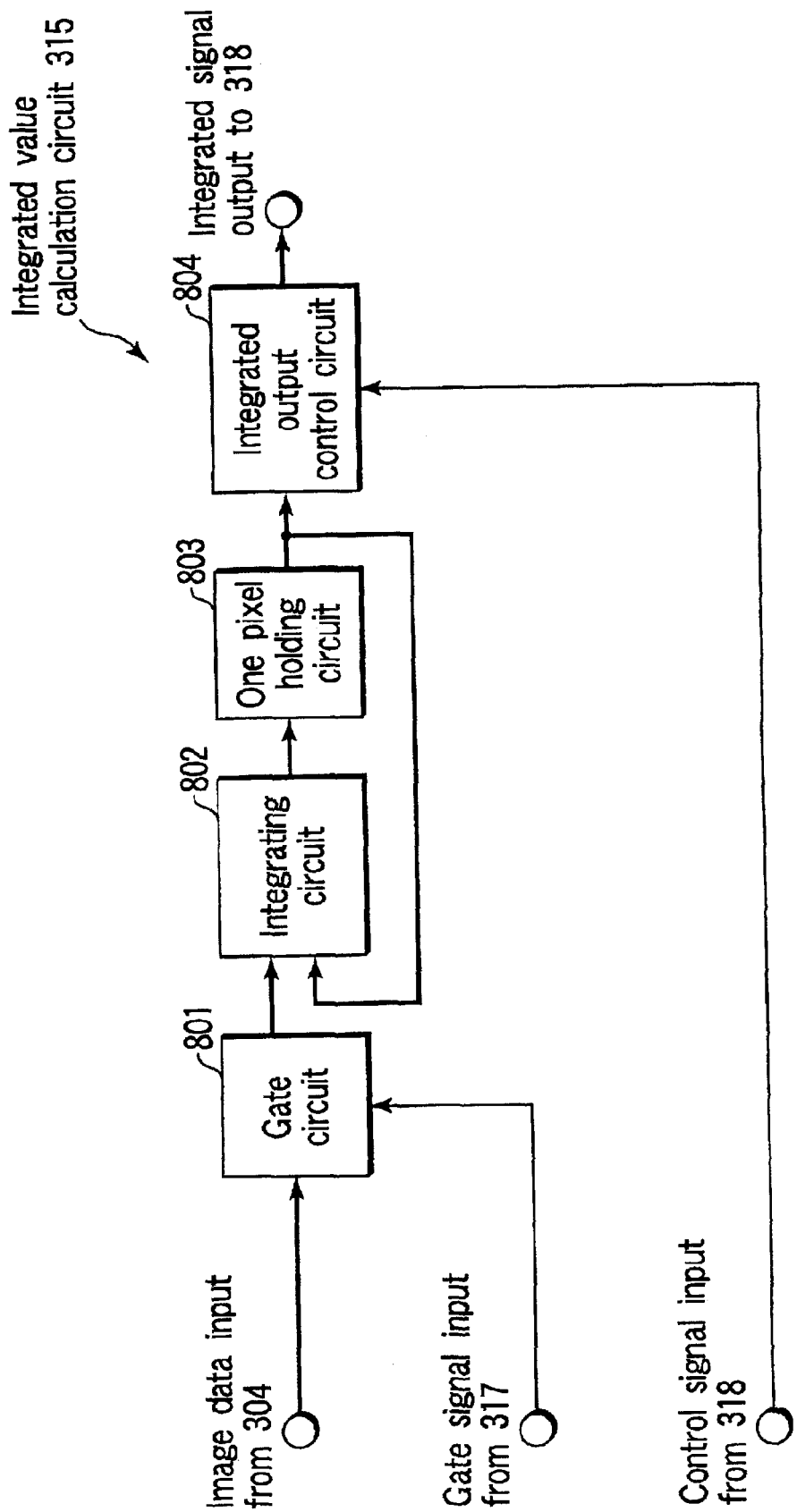
FIG. 8 shows the circuit arrangement of the integrated value calculation circuit of FIG. 3.

FIG. 8 shows the arrangement of the integrated value calculation circuit 315. Image data from the A/D conversion circuit 304 is input to a gate circuit 801, which is controlled by a gate signal produced by the gating waveform generation circuit 317. Thereby, the gate circuit 801 gates a required image field range in the divided regions 702 shown in FIG. 7.

The gated image signal is integrated next. That is, the image signal output from the gate circuit 801 is input to an integrating circuit and integrated as an input image signal of a one-pixel holding circuit 803.

This image signal is integrated during the gating interval. The integrated value is sent to an integrated output control circuit 804, which is responsive to a control signal from the microcomputer 318 to send the integrated signal to it.

Figure 9:
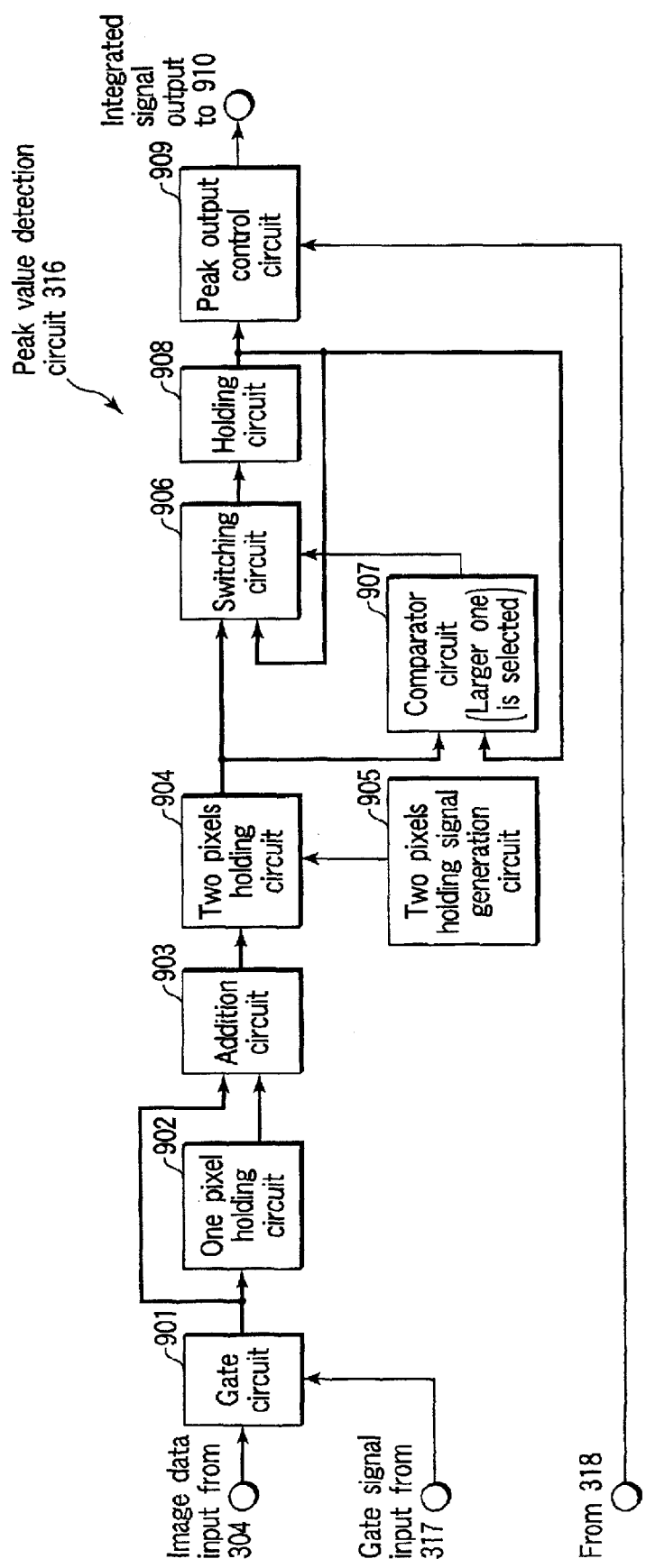
FIG. 9 shows the circuit arrangement of the peak value detection circuit of FIG. 3.

The arrangement of the peak value detection circuit 316 of FIG. 3 is shown in FIG. 9. As in the integrated value calculation circuit 315, the image data from the A/D conversion circuit 304 is input to a gate circuit 901, which is controlled by the gate signal produced by the gating waveform generation circuit 317. Thereby, the gate circuit 901 gates a required image field range in the divided regions 702 shown in FIG. 7.

The peak value of the gated image signal is detected next. The addition of two pixels is made before peak value detection. The reason is that, when the optical color filter of the CCD imaging element consists of a complementary color mosaic, the magnitude of the signal varies pixel by pixel. The addition of two pixels allows the influence of the color filter to be eliminated.

To add two pixels, the present signal and the signal one-bit time delayed by a one pixel holding circuit 902 are added together in an addition circuit 903. To make the sum of two pixels a unit, the sum signal is received by a two-pixel holding circuit 904 controlled by a two-pixel holding signal generation circuit 905. Thereby, a signal in units of two pixels is produced by the two pixel hold circuit 904.

The output signal of the two-pixel hold circuit 904 is compared in a comparator circuit 907 with the signal of two pixels before. The comparator produces a select signal to select a larger one and applied it to a switching circuit 906. As a result, the larger one of the present signal and the signal of two pixels before is selected in the switching circuit 906 and the selected one is input to and held in a hold circuit 908.

The comparison is made until the signal from the gate circuit 901 runs out. A peak output control circuit 909 is responsive to a control signal from the microcomputer 318 to receive the output (peak output signal) of the hold circuit 908 and send it to the microcomputer via an output terminal 910.

Next, the gating waveform generation circuit 317 will be described. As described above, to divide the image field, the gating signal is required. This signal is generated using the vertical sync signal VD, the horizontal sync signal HD, and the clock signal CLK.

Figure 10:
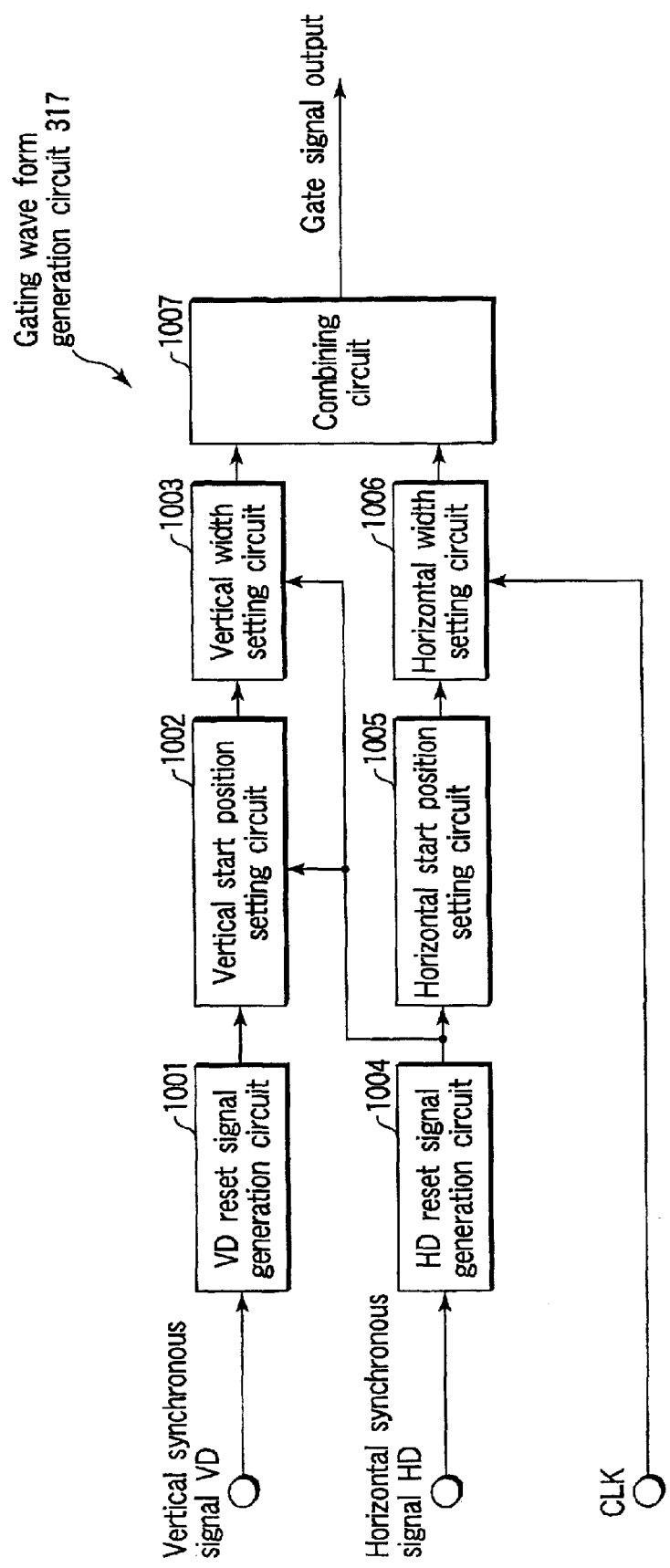
FIG. 10 shows the circuit arrangement of the gating waveform generation circuit of FIG. 3.

FIG. 10 shows the arrangement of the gating waveform generation circuit 317. The vertical sync signal VD is applied to a VD reset signal generation circuit 1001, which generates a VD reset signal. With reference to the reset signal, a vertical start position setting circuit 1002 counts the horizontal sync signal to set the vertical start position. When the vertical start position is set, a vertical width setting circuit 1003 counts the horizontal sync signal to set the vertical width.

The horizontal sync signal HD is applied to an HD reset signal generation circuit 1004, which generates an HD reset signal. With reference to the reset signal, a horizontal start position setting circuit 1005 counts the clock signal CLK to set the horizontal start position. When the horizontal start position is set, a horizontal width setting circuit 1006 counts the clock signal to set the horizontal width.

In this manner, the vertical and horizontal width signals are obtained from the vertical and horizontal width setting circuit 1003 and 1006, respectively. These signals are combined in a combining circuit 1007 into a composite signal, which serves as the previously described gate signal.

Next, the internal configuration of the microcomputer 318 in FIG. 3 will be described with reference to FIG. 11.

The microcomputer 318 in FIG. 3 reads the integrated value and the peak value of the image signal from the integrated value calculation circuit 315 and the peak value detection circuit 316, respectively, to control the electronic shutter circuit 305, the low-speed characteristic conversion circuit 310, the high-speed characteristic conversion circuit 311, and the addition or switching circuit 312. The software processing functions will be described next.

Figure 11:
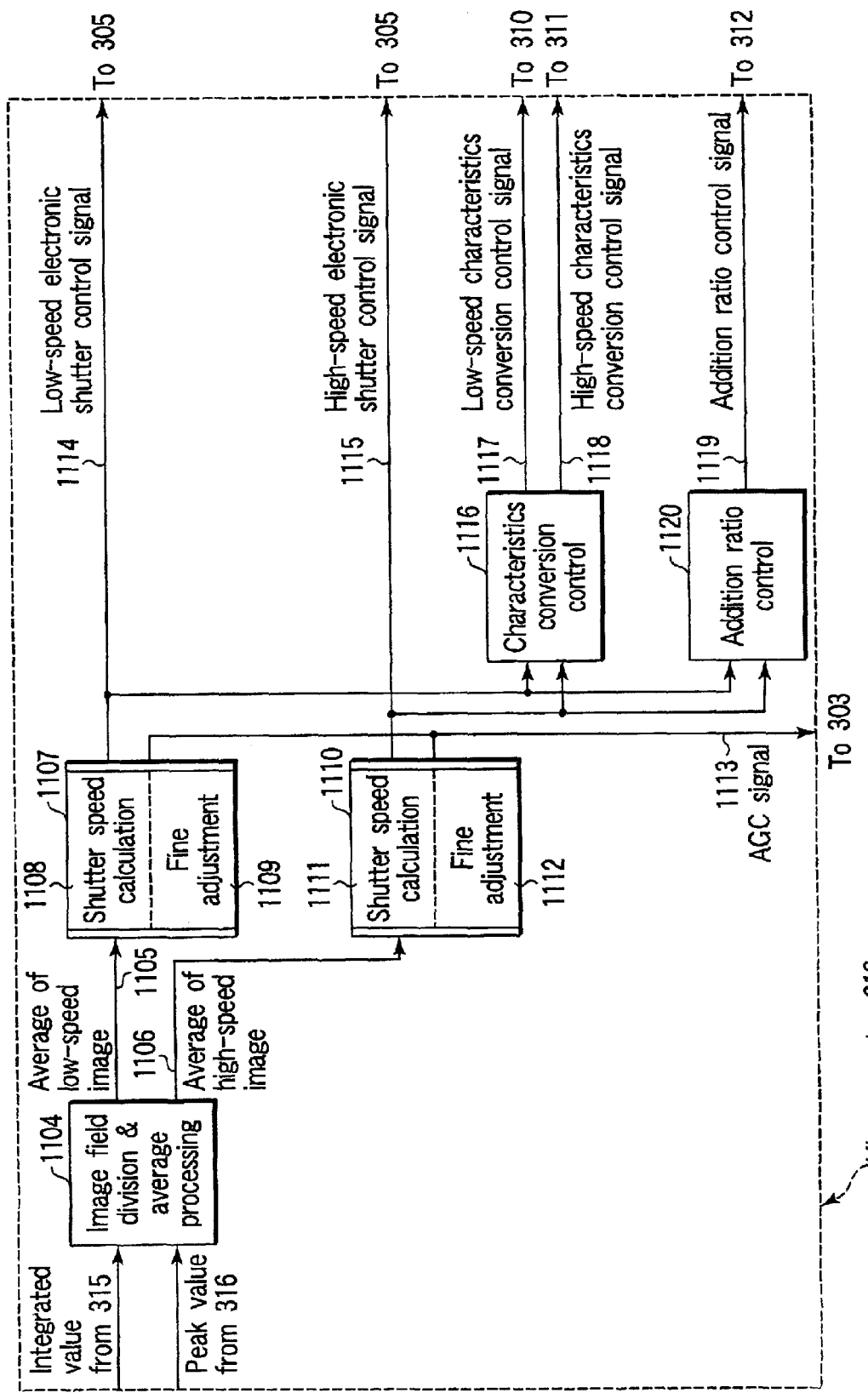
FIG. 11 shows the internal block configuration of the microcomputer of FIG. 3.

FIG. 11 shows an internal functional diagram of the microcomputer 318. An image field division and average processing section 1104 receives the integrated value of the image signal from the integrated value calculation circuit 315 and the peak value of the image signal from the peak value detection circuit 316 to output the average of low-speed image 1105 and the average of high-speed image 1106.

The two averages are applied to an exposure time control signal generation circuit 1107 adapted for low shutter speed and an exposure time control signal generation circuit 1110 adapted for high shutter speed, which perform shutter speed calculations 1108, 1111 and fine adjustment 1109, 1112.

The result of the shutter speed calculation 1108 is output as a low-speed electronic shutter control signal 1114. The result of the shutter speed calculation 1111 is output as a high-speed electronic shutter control signal 1115. These signals control the electronic shutter circuit 305 in FIG. 3.

The results of calculation of the shutter speeds by the exposure time control signal generating circuits 1107 and 1110 are applied to the AGC circuit 303 as an AGC signal 1113. In order to control the low- and high-speed shutter signals 1114 and 1115 according to minute variations in image brightness, the exposure time control signal generation circuits 1107 and 1110 make fine adjustments 1109 and 1112.

The low- and high-speed shutter signals 1114 and 1115 are applied to a characteristic conversion control section 1116 and an addition ratio control section 1120. The characteristic conversion control section 1116 produces low- and high-speed characteristic conversion control signals 1117 and 1118. The addition ratio control section 1120 produces an addition ratio control signal 1119. The low-speed characteristic conversion control signal 1117 is a control signal corresponding to low shutter speed. The high-speed characteristic conversion control signal 1118 is a control signal for high shutter speed.

The low- and high-speed characteristic conversion circuits 310 and 311 in FIG. 3 are controlled by the low- and high-speed characteristic conversion control signals 1117 and 1118, respectively. The addition ratio control section 1120 is also responsive to the low- and high-speed electronic shutter control signals 1114 and 1115 to produce an addition ratio control signal 1119, which is in turn applied to the addition or switching circuit 312 to thereby control the ratio at which the low and high shutter speed image signals are added.

FIGS. 12A through 12D illustrate a visual representation of data to which the microcomputer 318 makes reference in the image field division and average processing 1104 in FIG. 11.

First, based on the integrated value of the low shutter speed image signal obtained from the integrated value calculation circuit 315 and the peak value of the low shutter speed image signal obtained by the peak value detection circuit 316, the image field is divided into saturated and nonsaturated regions.

Next, the average of the low shutter speed image signal is calculated from the nonsaturated region of its integrated value. Further, the average of the high shutter speed image signal is calculated from the nonsaturated region of its integrated value. By dividing the region and determining the average in the image field division and average processing of FIG. 11, the subsequent shutter speed calculation sections 1108 and 1111 allow optimum exposure times for the low shutter speed image and the high shutter speed image to be calculated.

The above processing will be described more specifically with reference to FIGS. 12A through 12D. The pixel average value (in this case, 8 bits wide) is determined for each of the divided regions from the low shutter speed image integrated value. Areas in which the pixel average value is, say, more than 200 and the low shutter speed image peak value is maximum in 8-bit width are taken as saturated regions and other areas are taken as nonsaturated regions.

Figure 12A:
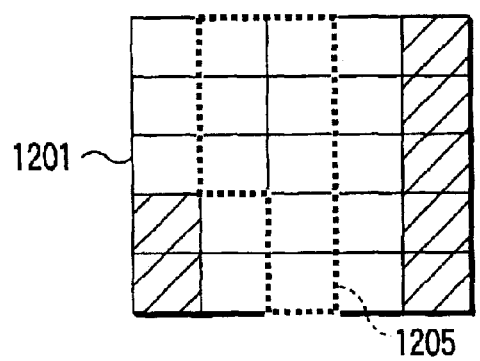
FIGS. 12A through 12D are diagrams for use in explanation of a processing method for the divided image field.
Figure 12B:
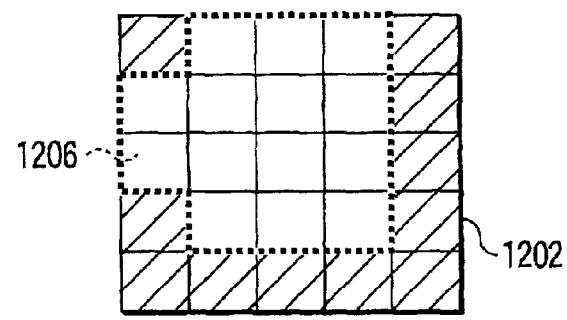

It is supposed that, as shown in FIG. 12A, an area in which the average value (the average of low shutter speed image) determined from the integrated value of low shutter speed image is more than 200 is a region 1205 enclosed with dotted lines and, as shown in FIG. 12B, an area in which the peak value of the low shutter speed image is maximum is a region 1206 enclosed with dotted lines.

Figure 12C:
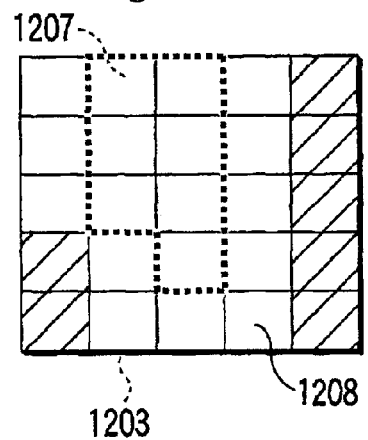
Figure 12D:
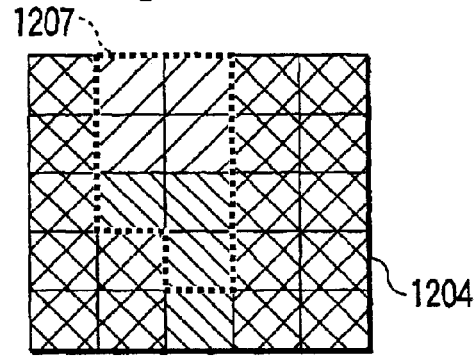

As shown in FIG. 12C, the area common to the regions 1205 and 1206 is taken as a saturated region 1207 and the other area is taken as a nonsaturated region 1208. The saturated region 1207 is taken as an imaging object at high shutter speed and the other region is taken as an imaging object at low shutter speed. As shown in FIG. 12D, the average value (high shutter speed image average value) determined from the high shutter speed image integrated value in each of the divided regions is also obtained by the image field division and average processing section 1104.

The shutter speed calculation sections 1108 and 1111 receive the low shutter speed image average value and the high shutter speed image average value from the image field division and average processing section 1104. When the low shutter speed image average value and the high shutter speed image average value exceed a given control range, the exposure time is changed in steps of a large width. Otherwise, the exposure time is changed in steps of a small width. That is, the wide dynamic range imaging apparatus of the present invention controls the exposure time in two steps of large and small widths.

In order for the low shutter speed image average value and the high shutter speed image average value to come to the center of the control range through the two-step control, a low-speed shutter control signal 1114 and a high-speed shutter control signal 1115 are output to control the electronic shutter circuit 305. The shutter speed calculation sections 1108 and 1111 differs from each other only in input and output but perform the same operation.

Thus, in the wide dynamic range camera of the present invention, the peak value detection circuit has a function of extracting a high-luminance area by detecting the peak luminance value of an image signal, the integrated value calculation circuit has a function of calculating the luminance average value in a low-luminance area other than the high-luminance area, and the exposure time control signal generation section produces a control signal to control the exposure time of an image signal from the luminance average value in a low-luminance area so that the shades of luminance in the low-luminance area are ensured.

In capturing first and second images in succession with the wide dynamic range camera of the present invention, the peak value detection circuit has a function of extracting a high-luminance area by detecting the peak luminance value of the first image signal, the integrated value calculation circuit has a function of calculating the luminance average value of the second image signal corresponding to the high-luminance area, and the exposure time control signal generating section produces a control signal to control the exposure time of the second image signal from the luminance average value in the high-luminance area so that the shades of luminance in the high-luminance area of the second image signal are ensured.

Figure 13:
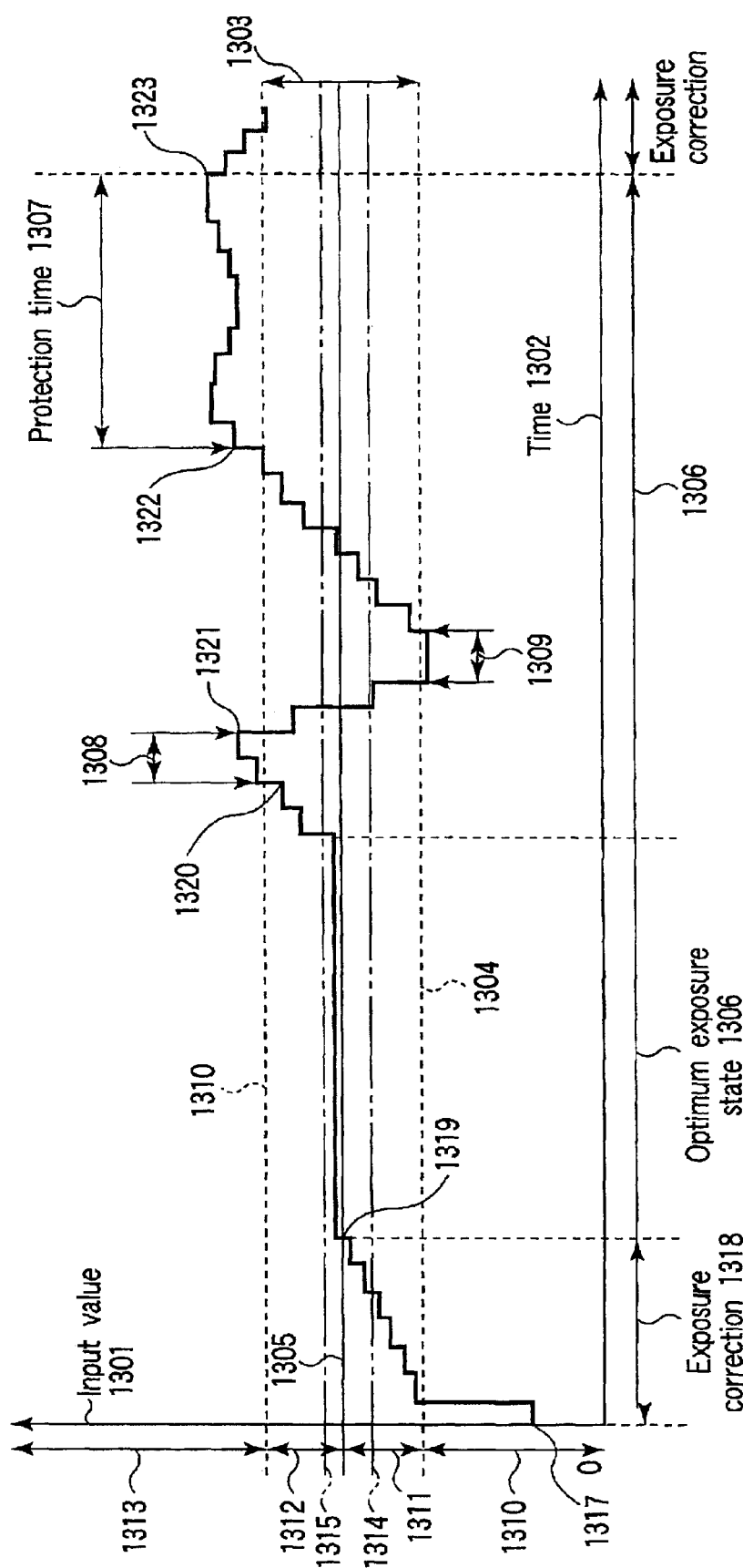
FIG. 13 shows control process transition.

FIG. 13 shows a graphical representation of the transition of the average value of low shutter speed image output from the image field division and average processing section 1104 in FIG. 11. The average values of low shutter speed image are shown on the vertical axis 1301 and the time is shown on the horizontal axis 1302. A stepwise varying waveform represents the transition of the average value of the low shutter speed image signal. In this example, the initial average value lies below optimum exposure width 1303. The exposure time is therefore increased up to a value given by exposure time=(present exposure time)×(lower limiting value 1304 of optimum exposure width)/(average value)   (1)

When the initial average value lies above the optimum exposure width 1303, the lower limiting value 1304 in equation (1) is replaced with the upper limiting value 1310 and the exposure time is then decreased down to a value given by the rewritten equation.

Once the average value falls within the optimum exposure range, the exposure time is changed by 10% with each vertical sync period V until the center 1305 of the optimum exposure width is exceeded. The change of the exposure time is stopped when the center of the optimum exposure width has just been exceeded. This state is taken as optimum exposure state 1306.

Once the average value reaches the optimum exposure state, the correction of the exposure time (exposure control) is not made unless values outside the optimum exposure width are observed successively for a constant period of time (for example, a period of time indicated by protection time 1307). In the example of FIG. 13, the average value varies again in intervals 1308 and 1309 to exceed the optimum exposure width. However, since this occurs within the protection time, the exposure time will not be changed.

Thus, by controlling the exposure time in two steps of a large width based on equation (1) and a small width by 10% with each vertical sync period V, an abrupt change in the luminance of an object can be accommodated quickly and a small luminance change can be responded slowly. By providing the protection time, oscillation based on an abrupt change in the luminance of a subject can be suppressed.

Figure 14:
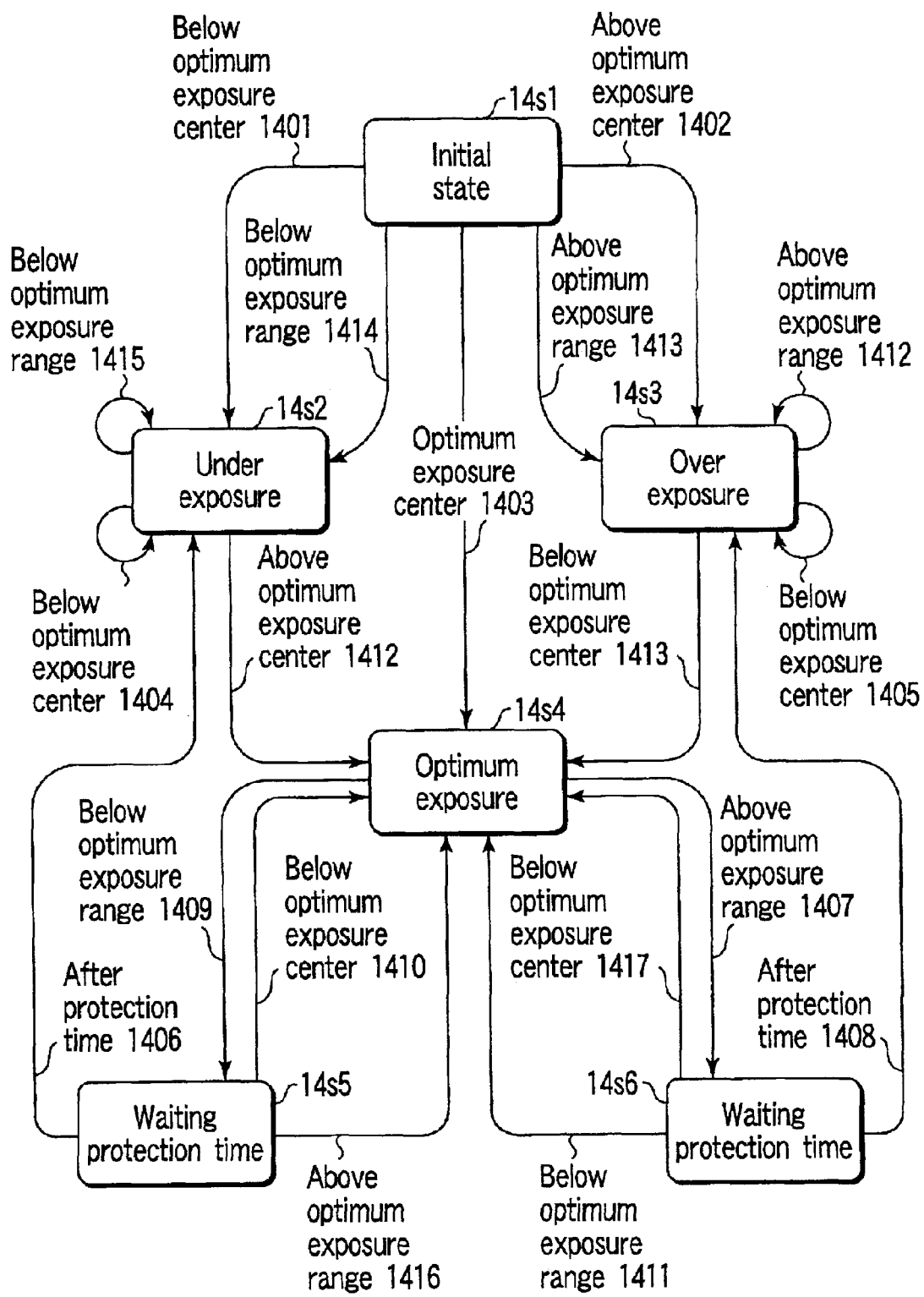
FIG. 14 is a state transfer diagram in program control.

The state transfer diagram of program control is shown in FIG. 14. Six states 14$s$1 to 14$s$6 are defined. The shutter speed calculations 1108 and 1111 in FIG. 11 are performed at all times in one of these states. For each state, events 1401 to 1417 required to carry out some processing are illustrated with arrows.

The shutter speed calculation sections 1108 and 1111 in FIG. 11 generate an event based on input average value applied from the image field division and average processing 1104 with each vertical sync period V. When a coincidence occurs between an event directed outwards from the present state and the generated event, a process corresponding to that event is executed and a transfer is then made to the state pointed to by the arrow. This repetition is performed with each vertical sync period V to implement the shutter speed calculation sections 1108 and 1111.

The state transfer diagram of FIG. 14 will be described more specifically taking FIG. 13 by way of example. For example, as shown at the side of the vertical axis in FIG. 13, the average value range is classified into 1310, 1311, 1312, and 1313.

There is a total of six events to be generated: a below-optimum-exposure-range event when the average value lies in the range 1310; a below-optimum-exposure-range-center event when the average value lies in the range 1311; an optimum-exposure-range-center event when the average value lies in the range 1305; an above-optimum-exposure-range-center event when the average value lies in the range 1312; an above-optimum-exposure-range event when the average value lies in the range 1313; and an after-protection-time event when the average value lies in the range 1313. The protection time is counted by a counter which is counted up with each vertical sync period V and the event of "after protection time" is generated when a given value is exceeded by that counter.

The shutter speed calculation 1108 in FIG. 11 starts with the initial state 14$s$1. The events to be processed in this state are the below optimum exposure range center event 1401, the above optimum exposure range center event 1402, the optimum exposure range center event 1403, the above optimum exposure range event 1413, and the below optimum exposure range event 1414. In FIG. 13, since the initial value 1317 from the image field division and average processing 1104 is contained in the range 1310, the event is the below optimum exposure range event 1414 and the exposure time is increased to the value given by equation (1). A transfer is then made to the under exposure state 14$s$2.

The events to be processed in the under exposure state 14$s$2 are the following three:

(1) The below optimum exposure range event 1415, in which case no state transfer is made and the exposure time is increased to the value given by equation (1).

(2) The below optimum exposure range center event 1404, in which case no state transfer is made and the exposure time is increased by 10%.

(3) The above optimum exposure range center event 1412, in which case a transfer is made to the optimum exposure state.

In the interval 1318 of FIG. 13, since the event is the below optimum exposure center event 1404, the exposure time is increased by 10% with each vertical sync period. At the average value 1319 (between 1314 and 1315), the event changes to the above optimum exposure center event 1412 to make a transfer to the optimum exposure state 14$s$4.

The events to be processed in the optimum exposure state 14$s$4 are the following two:

(1) The below optimum exposure range event 1409, in which case the protection time counter is reset and a transfer is made to the waiting protection time state 14$s$5.

(2) The above optimum exposure range event 1407, in which case the protection time counter is reset and a transfer is made to the waiting protection time state 14$s$6.

Since the average value 1320 falls into the range 1312, the event 1407 of "above optimum exposure range" is processed, so that the protection time counter is reset and started and a transfer is made to the waiting protection time state 14$s$6.

The events to be processed in the waiting protection time state 14$s$6 are the following three:

(1) The below optimum exposure range event 1411, in which case the protection time counter is reset and a transfer is made to the optimum exposure state 14$s$4.

(2) The below optimum exposure range center event 1417, in which case the protection time counter is reset and a transfer is made to the optimum exposure state 14$s$4.

(3) The after protection time event 1408, in which case a transfer is made to the over exposure state 14$s$3.

In the interval 1308, the average value lies in the range 1313, the state is the waiting protection time state 14$s$6. When the average value 1321 next falls into the range 1312, the event becomes the blow optimum exposure range event 1411 whereby the protection time counter is reset and a transfer is made to the optimum exposure state 14$s$4.

The average value falls again into the range 1313, so that the protection counter is reset and started by the above optimum exposure range event 1407 and a transfer is made to the waiting protection time state 14$s$6. At time 1323 when the protection counter exceeds the given value while the average value remains in the range 1313, the event becomes the after protection time event 1408 and a transfer is made to the over exposure state 14$s$3.

In the over exposure state 14s3, the exposure time is changed in the opposite direction to that in the under exposure state 14s2. Finally, the state becomes the optimum exposure state 14s4.

Next, the fine adjustments 1109 and 1112 in FIG. 11 will be described. The fine adjustments are processing of compensating for image field luminance variations with a long period. When the frequency of luminance fluctuations of an illumination source, e.g., the flicker frequency of a fluorescent lamp, and the frame frequency of the imaging element are very close to each other, there arise image field luminance variations with a very long period due to return skew. Such variations can be detected and controlled by the fine adjustments 1109 ad 1112, so that image field luminance variations with a long period arising in the optimum exposure control system are eliminated.

Figure 15:
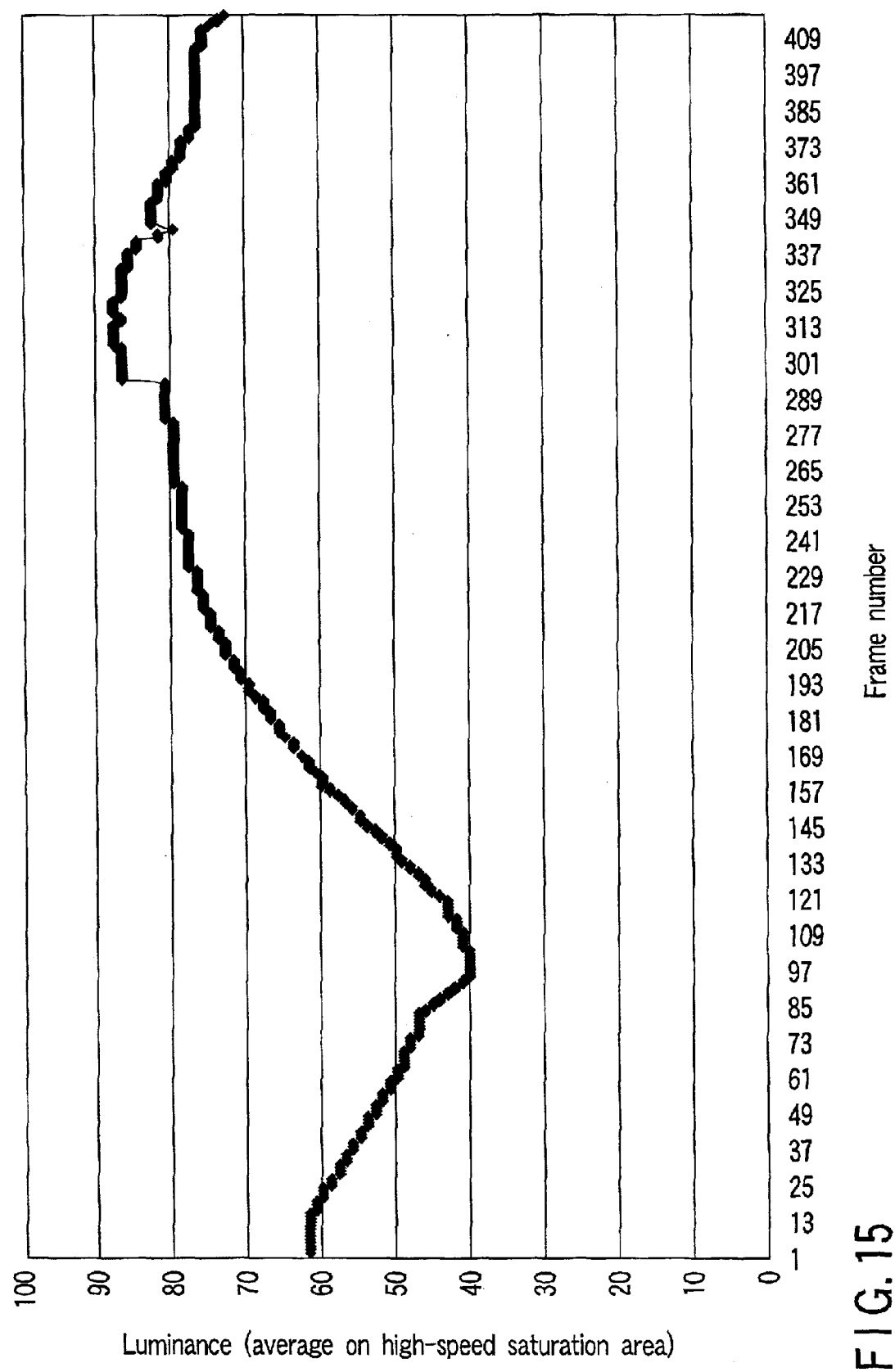
FIG. 15 shows gentle image field luminance variations by an AC illumination source.

FIG. 15 shows the measurements of image field luminance variations resulting from the relationship between the period of an illumination source and the frame period of the imaging element. The image luminance average values output from the image field division and average processing section 1104 in FIG. 11 are shown on the vertical axis and the frame number (corresponding to time) is shown on the horizontal axis. As shown, although the image luminance varies with a very gentle gradient, the variation width is as large as 30% and the average value may fall outside the optimum exposure range.

If the shutter control is performed using the shutter speed calculation 1108 alone, where the average value will exceed the optimum exposure range and the time exceeding the optimum exposure range will be longer than the protection time, the electronic shutter control signal is made active and controls the electronic shutter. In this operation, since the average value fluctuates up and down, the shutter control drives the electronic shutter into optimum exposure in each of the high and low average values, which will cause image luminance variations (oscillation) with a very long period to be produced. This problem is solved as follows: The gentle gradient of luminance variations within ±1% is detected at a period of one frame and the electronic shutter is driven into optimum exposure with each frame through minute shutter control. As for small luminance variations, adjustment to optimum exposure is made without the protection time. For luminance variations due to changes in image pattern, the usual exposure control is performed through the previously described shutter speed calculations.

Next, a method of controlling luminance variations with a long period will be described. The fine adjustment 1109 in FIG. 11 operates only when the shutter speed calculation 1108 judges that the optimum exposure is set. The operation of the fine adjustment 1109 is as follows:

During the optimum exposure, the shutter speed control 1108 stores the optimum exposure average value. This value is set as the initial value. When the average value varies within ±1% of the initial value with one frame as a period, average value variation rate=initial value/average value  (2)

is determined. Based on the result of this calculation, the microcomputer 318 calculates how many shifts of stages are required in a shift register of one clock unit 1605 shown in FIG. 16 to obtain the optimum exposure time. A shift of one stage corresponds to the amount of correction for 1% of exposure time. Since the microcomputer 318 recognizes the present exposure time, the correction time required is given by exposure correction time $[s]=(\frac{1}{100})\times$(present exposure time)$[s]$  (3)

The number of shift register stages for exposure correction is given by shift register stages number=(exposure correction time $[s]$)/(one period of master clock $[s]$)  (4)

The use of the number of stages of the shift register obtained from equation (4) as a control signal of the shift register 1605 allows very minute exposure time adjustment. That is, a fine adjustment of ±1% of exposure time can be realized on a frame-by-frame basis. The fine adjustment could be applied to AGC for CCD output signal as shown in FIG. 11, in which case there would be a degradation in S/N because of increase in amplification.

The low-speed characteristics conversion control signal 1117 and the high-speed characteristics conversion control signal 1118 shown in FIG. 11 are control signals used, in combining a low shutter speed image and a high shutter speed image into a dynamic range extended image, to optimize the composite image. The control signals are used for nonlinear process control, such as gamma correction, in the lower and higher shutter speed characteristic conversion circuits 310 and 311 as described previously in conjunction with FIG. 3.

The problems with image combination are as follows: The simple addition of two images alone for increasing the dynamic range extension rate produces nonlinear skew in the shades of the composite image, resulting in a poor contrast image. Thus, it is required to suppress the nonlinear skew and minimize the reduction in contrast by converting the characteristics of image signals according to the dynamic range extension rate prior to addition of two images.

The nonlinear process control is performed as follows: First, the dynamic range extension rate is calculated from the exposure time ratio as dynamic range extension rate=low-speed shutter control signal 1114/high-speed shutter control signal 1115  (5)

This value indicates the dynamic range extension rate at the completion of the exposure control. In the characteristic conversion control 1116, the dynamic range extension rate is calculated and the result is output as a control signal.

On the other hand, the characteristic conversion circuits of the processing section (the low- and high-speed characteristic conversion circuits 310 and 311) have tables of $X^1$ to $X^0$ and $\log_{10}(1$ to $10)$ (exponential characteristics) as their input-output characteristics. The tables are switched by the above control signal, thereby improving nonlinear distortion on image signals.

Next, the dynamic range extension rate and the table selection are related as follows:

If extension rate<16, then the $X^1$ table is selected.
If $16 \leq$ extension rate $\leq 64$, then the $X^{0.7}$ table is selected.
If 64<extension rate, then the $X^0$ table is selected.

The characteristic conversion control section 1116 provides the results of the conditional branch as the low- and high-speed characteristic conversion control signals 1117 and 1118, thus making automatic table switching in the characteristic conversion circuits in the signal processing system (the low- and high-speed characteristic conversion circuits 310 and 311 in FIG. 3).

The purpose of the addition ratio control 1120, which is similar to that of the characteristic conversion control 1116, is to optimize the combination ratio of the low shutter speed image and the high shutter speed image so that the contrast of the composite image is increased. The drawback of the composite image is a significant degradation in contrast because the increased dynamic range extension image results in a faded whitening image.

The reason is that almost all the area of the low shutter speed signal is saturated, and the high shutter speed signal is superposed on the saturated signal. To compensate for the reduced contrast, the extension rate is increased and the combination ratio of the high shutter speed image to the low shutter speed image is increased to suppress the whitening of the image. In particular, the contrast of the composite image can be increased effectively by performing the addition ratio control simultaneously with the characteristic conversion.

Next, the operation of the addition ratio control 1120 shown in FIG. 11 will be described. As with the characteristic conversion control 1116, in the addition ratio control 1120, the dynamic range extension ratio is calculated to produce the addition ratio control signal 1119 for switching the combination ratio of the low and high shutter speed signals. This control signal is sent to the addition circuit 312 previously described in conjunction with FIG. 3 to automatically control the ratio at which the two images are combined, i.e., the addition ratio.

The dynamic range extension rate (exposure time ratio) and the addition ratio are related as follows:

If extension rate=1, then L=0% and H=100%.
If 1<extension rate<6, then L=6% and H=94%.
If 6≦extension rate<8, then L=12% and H=88%.
If 8<extension rate, then L=25% and H=75%.

Here, L stands for the low shutter speed image and H the high shutter speed image. The above addition ratios are merely exemplary and can be changed as required.

As described using FIGS. 13, 14 and 15, in the wide dynamic rage imaging apparatus of the present invention, the optimum exposure to which the exposure time is to conver is set at least from the luminance average value of image field information of a first image signal, a second image signal, a third image signal, and so on. Further, the convergence range (allowable range) is set with the optimum exposure as a center and moreover two convergence ranges are set: a wide one and a narrow one.

In the event that the luminance average value is displaced from the convergence range, the measurement of elapsed time is started from the time of displacement. To judge whether or not the luminance average value will return to within the convergence range within a predetermined period of time, the previously described protection time is set up as the predetermined period of time. A different protection time is set up for each convergence range. With the wide convergence range, when the luminance average value varies greatly, the electronic shutter speed is changed for return to optimum exposure. With the narrow convergence range, on the other hand, the electronic shutter speed is changed when the luminance average value varies slightly.

Figure 16:
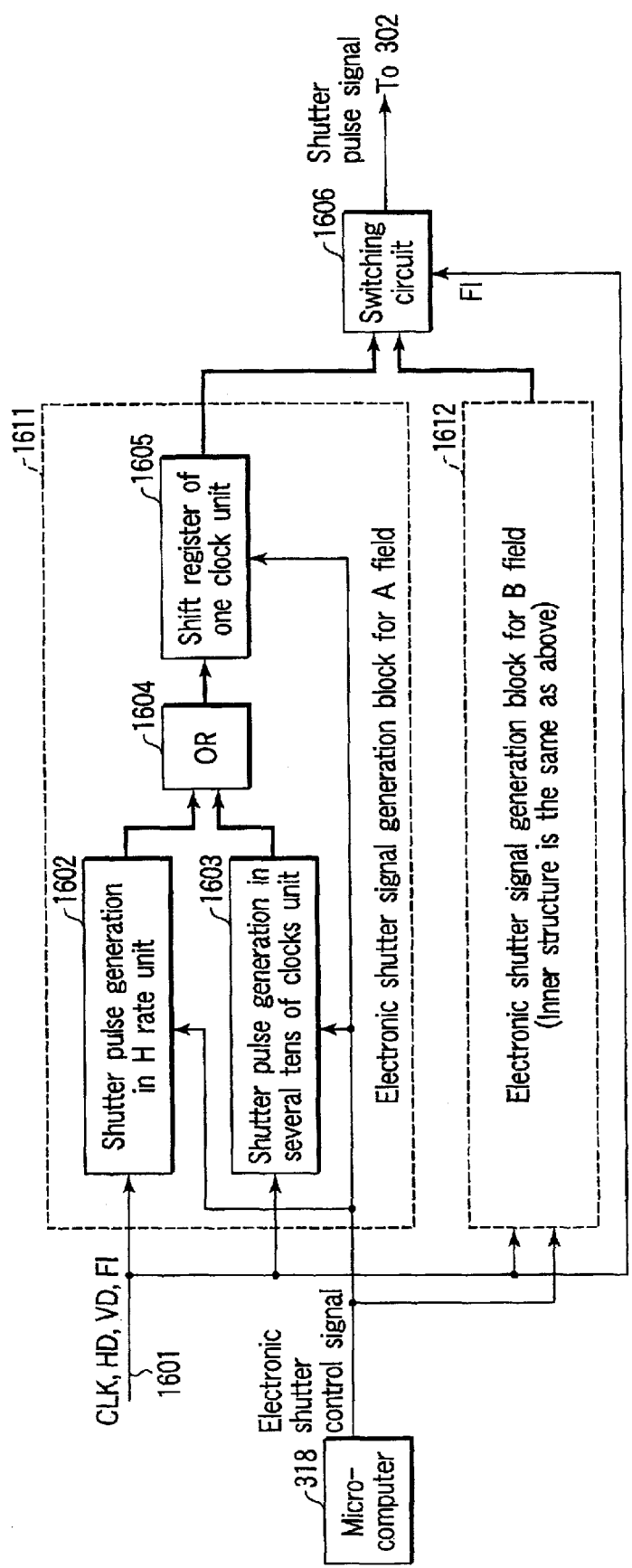
FIG. 16 shows the circuit arrangement of the electronic shutter pulse generation circuit of FIG. 3.

Next, the arrangement and operation of the electronic shutter circuit 305 in FIG. 3 will be described with reference to FIG. 16 which illustrates its arrangement. As with usual electronic shutter circuits, blocks 1602 to 1604 are provided with shutter pulse generation 1602 in horizontal interval unit (H rate unit) and shutter pulse generation 1603 in several tens of clocks unit. Output pulses of the shutter pulse generation 1602, 1603 are multiplexed by an OR circuit 1604 and then input to a one clock unit shift register 1605.

To an input portion 1601 are input the master clock (CLK), horizontal sync pulse (HD), vertical sync pulse (VD), and field information (FI).

Dotted enclosure 1611 forms an electronic shutter signal generation block for A field. Dotted enclosure 1612 forms an electronic shutter signal generation block for B field, which is configured identically to the block 1611.

Based on image field information obtained by the integrated value calculation circuit 315 and the peak value detection circuit 316 shown in FIG. 3, the microcomputer 318 shown in FIG. 11 produces electronic shutter signals 1114 and 1115 optimized for the respective fields. On the other hand, electronic shutter pulses to fine adjust the exposure amount in units of one clock are obtained by the shift register 1605 shown in FIG. 16 that provides delays in units of one clock. The amount of delay in the shift register is controlled by the control signal from the microcomputer 318.

The switching circuit 1606 is supplied with the image field information FI whereby the A-field or B-field shutter pulse is selectively output. Here, an individual electronic shutter pulse is applied for each field image. First, as shown in FIG. 16, the A-field electronic shutter control signal and the B-field electronic shutter control signal are applied to A- and B-field electronic shutter signal generation blocks 1611 and 1612, respectively, thereby producing an individual electronic shutter pulse for each of the A and B fields. The two electronic shutter pulses are then switched by the switching circuit 1606 whereby an individual electronic shutter pulse is produced for each of the A and B fields.

FIG. 17 shows the timing of generating electronic shutter pulses when a CCD is used as the imaging element. In the upper portion of FIG. 17, there is illustrated vertical sync pulses VD and, in the lower portion, there is shown the operation of the electronic shutter pulse viewed from the vertical sync rate. The electronic shutter pulse in each field is generated at the same timing as in usual television cameras. The generation of an electronic shutter pulse in the horizontal sync rate is started at near the trailing edge of the vertical sync pulse. At a time in the first half of the next vertical sync pulse, the generation of an electronic shutter pulse in a rate of several or several tens of clocks is started.

Figure 19:
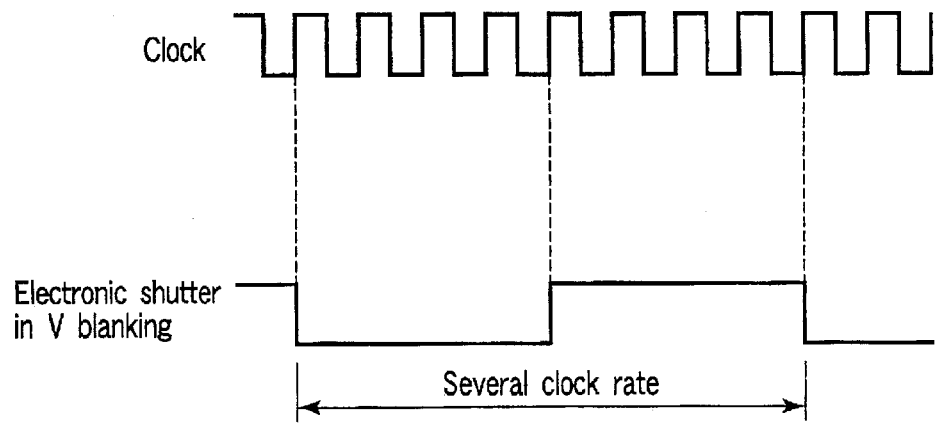
FIG. 19 shows a relationship of an electronic shutter pulse to clock pulses in the vertical blanking period.

Partly enlarged diagrams of the pulse timing diagram of FIG. 17 are shown in FIGS. 18 and 19. In the upper portion of FIG. 18, there is shown a horizontal sync pulse HD in the image signal interval and, in the lower portion, there is shown an electronic shutter pulse in H rate.

FIG. 19 shows an electronic shutter pulse in the vertical blanking interval. In the upper portion of FIG. 19, there is shown the master clock and, in the lower portion, there is shown a shutter pulse in several clocks rate. Here, the exposure time of an image is the interval from a charge readout pulse (field shift pulse) in the vertical blanking period to the time when the first electronic shutter pulse is generated.

The shutter pulse in H rate is started immediately after a charge readout pulse (field shift pulse) in the vertical blanking (V blanking) interval and ends immediately before the V blanking period. On the other hand, the time at which the shutter pulse in several clock rate is started is between the time immediately after the start of the V blanking period and the time immediately before the charge readout pulse. The timing of generating of these electronic shutter pulses remains unchanged from that in conventional CCD cameras.

Figure 20:
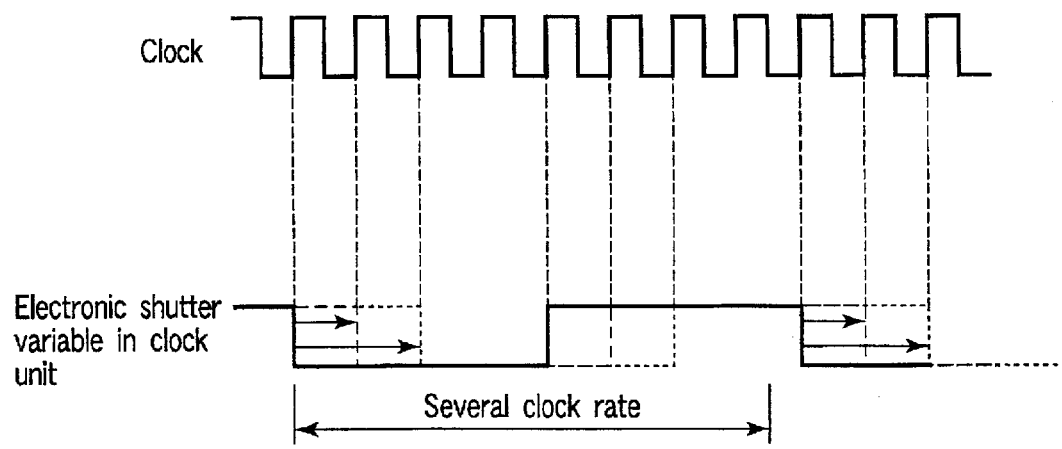
FIG. 20 shows variability of the phase of the electronic shutter pulse with respect to clock pulses in the vertical blanking period.

FIG. 20 shows the electronic shutter operation characteristic of the CCD camera of the present invention which allows fine adjustment of the image exposure time at a rate of one clock period only by controlling the shutter speed. In the conventional electronic shutter operation, if the shutter pulse at a rate of several clock periods is shortened by one pulse period immediately before the charge readout pulse, the exposure time will be changed by about 50%. Therefore, there is a drawback that the unit change in the exposure time becomes excessively large.

In contrast, the fine adjustment characteristic of the CCD camera of the present invention shown in FIG. 20 allows the exposure time adjustment by the shutter pulse generated immediately before the charge readout pulse to be made in increments of several percent. Thus, the image luminance can be adjusted finely. For this reason, even in an image exposed at a high electronic shutter speed for a highly bright part, the flicker correction described in connection with FIG. 15 can be made only by the electronic shutter. That is, an excellent advantage that the flicker of an high shutter speed image is corrected only by the electronic shutter can be obtained in the wide dynamic range imaging apparatus.

Specifically the fine adjustment of the electronic shutter operation is made by shifting the electronic shutter pulse in units of one pixel clock and adjusting the exposure time in units of the master clock period. In this manner, the dynamic electronic shutter control system of the wide dynamic range camera can be constructed.

In the wide dynamic range imaging apparatus of the present invention, the image signal and control signal processing sections can be integrated. For example, circuits that can be formed on a single semiconductor chip include the electronic shutter circuit 305, the low shutter speed memory 306, the high shutter speed memory 307, the low shutter speed image signal switching circuit 308, the high shutter speed image signal switching circuit 309, the low shutter speed characteristic conversion circuit 310, the high shutter speed characteristic conversion circuit 311, the addition or switching circuit 312, the integrated value calculation circuit 315, the peak value detection circuit 316, the gate waveform generation circuit 317, and the gain control circuit 303. Still other combinations of circuits are also possible.

Although the wide dynamic range imaging apparatus of the present invention has been described by way of an example of using a CCD imaging element, this is not restrictive. The principles of the invention are also applicable to a camera using another type of imaging element such as a CMOS sensor.

According to the present invention, as described above, the image of a scene having a very wide range of incident light amount can be captured by using different exposure time to capture the scene image and processing the resultant image signals. Since each of the high shutter speed and the low shutter speed is individually selected automatically, the scene image can be captured even if the difference in luminance between parts in the scene is very large, which allows the imaging apparatus of the present invention to have a wide range of application, such as application to a special supervisory camera.

Although the embodiment of the wide dynamic range imaging apparatus of the present invention has been described, the present invention is not restricted to the embodiment described herein. The configuration of the imaging apparatus of the invention basically conforms to the block configuration shown in FIG. 3. In particular, the partial circuits that form the execution section shown in FIGS. 8, 11 and 16 and their related descriptions have been given as a specific example to make the disclosure of the invention more perfect and make the scope of the invention known to those skilled in the art. Therefore, the partial circuits may be modified in various ways without being restricted to the configuration disclosed herein.

Additional advantages and modifications will readily occur to those skilled in the art. Therefore, the invention in its broader aspect is not limited to the specific details and representative embodiment shown and described herein. Accordingly, various modifications may be made without departing from the spirit or scope of the general inventive concept as defined by the appended claims and their equivalents.

What is claimed is:

1. An imaging apparatus comprising:
   a first image signal generation section generating a first image signal in image field units by capturing the image of a scene in a first exposure time;
   a second image signal generation section generating a second image signal in image field units by capturing the image of the scene in a second exposure time different from said first exposure time;
   an image combining section combining said first and second image signals into a composite image signal by adding said first and second image signals or switching between them on a pixel basis;
   an integrated value calculation circuit determining average luminance values of said first and second image signals;
   a peak value detection circuit detecting peak values of said first and second image signals;
   an exposure time control signal generation section responsive to outputs of said integrated value calculation circuit and said peak value detection circuit generating control signals controlling said first and second exposure times; and
   a gain control circuit controlling an amplitude of each of said first and second image signals to be applied to said image combining section individually.

2. The imaging apparatus according to claim 1, wherein said peak value detection circuit has a function of extracting a high-luminance area by detecting a peak luminance value of said first image signal, said integrated value calculation circuit has a function of calculating an average luminance value of a low-luminance area other than the high-luminance area in said first image signal, and said exposure time control signal generation section has a function of generating a control signal controlling the exposure time of said first image signal from said average luminance value of said low-luminance area in said first image signal so as to ensure shades of luminance in said low-luminance area.

3. The imaging apparatus according to claim 1, wherein said peak value detection circuit has a function of extracting a high-luminance area by detecting a peak luminance value of said first image signal, said integrated value calculation circuit has a function of calculating an average luminance value of said second image signal corresponding to said high-luminance area in said first image signal, and said exposure time control signal generation section has a function of generating a control signal controlling the exposure time of said second image signal from said average luminance value of said second image signal so as to ensure shades of luminance in said high-luminance area in said second image signal.

4. The imaging apparatus according to claim 1, wherein, when the exposure time of said first image signal is not less than several times that of said second image signal, said exposure time control signal generation section has a function of generating control signals increasing a combination ratio of a low shutter speed image to a high shutter speed image in said image combining section with an increase in a ratio of the exposure times of said first and second image signals and a function of decreasing an index of an exponential function which is characteristics of a characteristic conversion circuit contained in said ratio of the exposure times.

5. The imaging apparatus according to claim 4, wherein, when said ratio of the exposure times of said first and second image signals is eight or more, said combination ratio of said low shutter speed image to said high shutter speed image in said first and second image signals is set at about three or more.

6. The imaging apparatus according to claim 4, wherein said index of the exponential function decreases in the range of $X^1$ to $X^0$ where X is a variable.

7. The imaging apparatus according to claim 1, wherein an electronic shutter pulse generation circuit changing the exposure time of the electronic shutter has a shutter control function of changing an interval between pulse edges in units of several clocks or several tens of clocks.

8. The imaging apparatus according to claim 7, wherein a range of adjustment of the exposure time is several percent of the exposure time.

9. The imaging apparatus according to claim 7, wherein said interval between pulse edges changes during a vertical blanking period where a signal is read from an imaging element.

10. The imaging apparatus according to claim 1, further comprising an electronic shutter circuit which shifts a final generation timing of an electronic shutter pulse determining said exposure time in one clock unit of a timing generator.

11. The imaging apparatus according to claim 10, wherein the one clock unit of said timing generator is a one pixel clock unit of said first and second image signals.

12. The imaging apparatus according to claim 1, wherein an image signal processing section, said peak value detection circuit, an electronic shutter circuit which shifts a final generation timing of an electronic shutter pulse determining the exposure time in one clock unit of a timing generator and said gain control circuit controlling an amplitude of each of the first and second image signals to be applied to said image combining section individually are integrated on a single chip.

13. A signal processing method for an imaging apparatus comprising:

setting an optimum average luminance value to which an average luminance value is to converge from image field information of at least first, second and third successive image signals;

setting an allowable convergence range centered at said optimum average luminance value;

starting a measurement of elapsed time when said average luminance value falls outside said convergence range;

setting a predetermined time for a standard of judgment of whether or not said average luminance value returns to said convergence range based on the elapsed time as a protection time;

when said average luminance value falls outside said convergence range, returning said average luminance value to said optimum average luminance value by changing an exposure time in a first adjustment width; and when said average luminance value falls within the convergence range, returning said average luminance value to said optimum average luminance value by changing said exposure time in a second adjustment width.

14. The signal processing method according to claim 13, wherein said allowable convergence range centered at said optimum average luminance value consists of a first convergence range large in width and a second convergence range small in width.

15. The signal processing method according to claim 13, wherein said first adjustment width of said exposure time is given by (exposure time)×(lower limiting value of convergence range)/(average luminance value)

when said average luminance value is below said convergence range, and (exposure time)×(upper limiting value of convergence range)/(average luminance value)

when said average luminance value is above said convergence range.

16. The signal processing method according to claim 13, wherein said second width of adjustment of said exposure time is 10% of said exposure time.

* * * * *